US012591768B2

(12) United States Patent
Ma et al.

(10) Patent No.: US 12,591,768 B2
(45) Date of Patent: Mar. 31, 2026

(54) DEEP LEARNING ACCELERATION WITH MIXED PRECISION

(71) Applicant: Micron Technology, Inc., Boise, ID (US)

(72) Inventors: Sen Ma, Bellevue, WA (US); Aliasger Tayeb Zaidy, Seattle, WA (US); Dustin Werran, New York, NY (US)

(73) Assignee: Micron Technology, Inc., Boise, ID (US)

( * ) Notice: Subject to any disclaimer, the term of this patent is extended or adjusted under 35 U.S.C. 154(b) by 959 days.

(21) Appl. No.: 17/807,290

(22) Filed: Jun. 16, 2022

(65) Prior Publication Data

US 2023/0206044 A1 Jun. 29, 2023

Related U.S. Application Data

(60) Provisional application No. 63/266,060, filed on Dec. 28, 2021.

(51) Int. Cl.
*G06N 3/063* (2023.01)
*G06F 7/544* (2006.01)
(52) U.S. Cl.
CPC ........... *G06N 3/063* (2013.01); *G06F 7/5443* (2013.01)
(58) Field of Classification Search
CPC .............................. G06N 3/063; G06F 7/5443
See application file for complete search history.

(56) References Cited

U.S. PATENT DOCUMENTS

2019/0042252 A1* 2/2019 Kaul ..................... G06F 7/5443

OTHER PUBLICATIONS

Na, Taesik, and Saibal Mukhopadhyay. "Speeding up convolutional neural network training with dynamic precision scaling and flexible multiplier-accumulator." Proceedings of the 2016 International Symposium on Low Power Electronics and Design (Year: 2016).*
V. Camus, C. Enz and M. Verhelst, "Survey of Precision-Scalable Multiply-Accumulate Units for Neural-Network Processing," 2019 IEEE International Conference on Artificial Intelligence Circuits and Systems (AICAS), Hsinchu, Taiwan (Year: 2019).*
(Continued)

*Primary Examiner* — Shahid K Khan
(74) *Attorney, Agent, or Firm* — Harrity & Harrity, LLP

(57) ABSTRACT

A device for deep learning acceleration with mixed precision may include a first data port configured to receive a map data segment and a second data port configured to receive a kernel data segment. The device may include a precision mode port configured to receive an indication of an input precision mode that indicates a word length for the map data segment and for the kernel data segment. The device may include a multiplier component configured to generate a multiplier component output based on the input precision mode and based on multiplying the map data segment and the kernel data segment. The device may include an adder component configured to generate an adder component output based on the input precision mode and based on the multiplier component output. The device may include an output port configured to output the adder component output.

20 Claims, 14 Drawing Sheets

(56) References Cited

OTHER PUBLICATIONS

Zhang, Hao, Hyuk Jae Lee, and Seok-Bum Ko. "Efficient fixed/floating-point merged mixed-precision multiply-accumulate unit for deep learning processors." 2018 IEEE international symposium on circuits and systems (ISCAS). IEEE (Year: 2018).*

Zhao, Yiren, et al. "Automatic generation of multi-precision multi-arithmetic CNN accelerators for FPGAs." 2019 International Conference on Field-Programmable Technology (ICFPT). IEEE (Year: 2019).*

Zhang, Song, et al. "A multiple-precision multiply and accumulation design with multiply-add merged strategy for AI accelerating." Proceedings of the 26th Asia and South Pacific Design Automation Conference (Year: 2021).*

V. Harish and K. S., "Comparative Performance Analysis of Karatsuba Vedic Multiplier with Butterfly Unit," 2019 3rd International conference on Electronics, Communication and Aerospace Technology (ICECA), Coimbatore, India (Year: 2019).*

Zhao, Yiren, et al. "Automatic generation of multi-precision multi-arithmetic CNN accelerators for FPGAs." 2019 International Conference on Field-Programmable Technology (ICFPT). IEEE, 2019 (Year: 2019).*

Na, Taesik, and Saibal Mukhopadhyay. "Speeding up convolutional neural network training with dynamic precision scaling and flexible multiplier-accumulator." Proceedings of the 2016 International Symposium on Low Power Electronics and Design. 2016. (Year: 2016).*

* cited by examiner

1200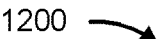

1210 ⌒ Receive a map data segment

1220 ⌒ Receive a kernel data segment

1230 ⌒ Receive an indication of an input precision mode that indicates a word length for the map data segment and for the kernel data segment 1240 ⌒ Generate a multiplier component output based on the input precision mode, based on multiplying a first half of the map data segment and a first half of the kernel data segment to generate a first multiplier output, and based on multiplying a second half of the map data segment and a second half of the kernel data segment to generate a second multiplier output 1250 ⌒ Generate an adder component output based on the input precision mode, based on adding a first half of the multiplier component output and a first half of a return value to generate a first adder output, and based on adding a second half of the multiplier component output and a second half of the return value to generate a second adder output 1260 ⌒ Output the adder component output

FIG. 12

DEEP LEARNING ACCELERATION WITH MIXED PRECISION

CROSS-REFERENCE TO RELATED APPLICATION

This patent application claims priority to Provisional Patent Application No. 63/266,060, filed on Dec. 28, 2021, and entitled "DEEP LEARNING ACCELERATION WITH MIXED PRECISION." The disclosure of the prior application is considered part of and is incorporated by reference into this patent Application.

TECHNICAL FIELD

The present disclosure generally relates to deep learning acceleration and, for example, to devices and methods for convolutional neural network acceleration with mixed precision.

BACKGROUND

A convolutional neural network (CNN) is a type of artificial neural network often used for deep learning. CNNs are often used for image processing, such as image recognition, image classification, image segmentation, or the like. However, CNNs can also be used for other applications, such as spatial data analysis, computer vision, natural language processing, signal processing, document classification, sentiment analysis, providing recommendations, or the like. Neural networks often use a large number of parameters to generate an output, such as thousands, millions, or more parameters. As a result, performing operations on those parameters to execute a trained neural network can be slow because of the large number of parameters and the large number of operations that need to be performed on those parameters.

BRIEF DESCRIPTION OF THE DRAWINGS

FIG. 12 is a flowchart of an example method associated with deep learning acceleration with mixed precision.

DETAILED DESCRIPTION

Executing a trained machine learning model (sometimes called "inferencing") involves a large number of parameters (e.g., inputs and weights) and a large number of operations, such as mathematical calculations, performed on those parameters. Generally speaking, larger neural networks (e.g., with a larger number of parameters, operations, and layers) provide more accurate output than smaller neural networks. However, larger neural networks require more memory resources, more processing power, and longer training and execution times than smaller neural networks.

To reduce computing resources (e.g., memory resources, processing power, memory bandwidth, data transfer operations, and electrical power) and processing time needed to apply a trained neural network to a data set, less precise values of the neural network may be used (e.g., less precise input values or map values, or less precise weight values or kernel values). For example, 8 bits may be used to represent a value rather than 16 bits being used to represent the value. This conserves computing resources and reduces processing time, but results in less accurate model output.

In some cases, mixed precision operations may be used to achieve benefits associated with higher precision (e.g., more accurate output) while also achieving benefits associated with lower precision (e.g., reduced computing resources and processing time). With mixed precision operations, operations that require high precision (e.g., more bits to represent a value) can be identified, and high precision can be used only for those operations. Other operations use low precision (e.g., fewer bits to represent a value). In some cases, mixed precision computing may perform calculations using lower precision values, and may store data using higher precision values.

Some devices and methods described herein enable mixed precision computations to be performed, such as during execution of a trained machine learning model (e.g., a CNN), to achieve the benefits associated with higher precision and the benefits associated with lower precision. For example, some devices and methods described herein enable the same device architecture to use different precision modes (e.g., high precision or low precision) during different machine learning model operations. Similarly, some devices and methods described herein enable the same device architecture to execute a machine learning model using a selected precision mode out of multiple precision mode options (e.g., depending on a precision level needed for an application of the machine learning model). Furthermore, some devices and methods described herein enable a machine learning model to be executed faster by utilizing parallel processing and parallel computation.

Figure 1A:
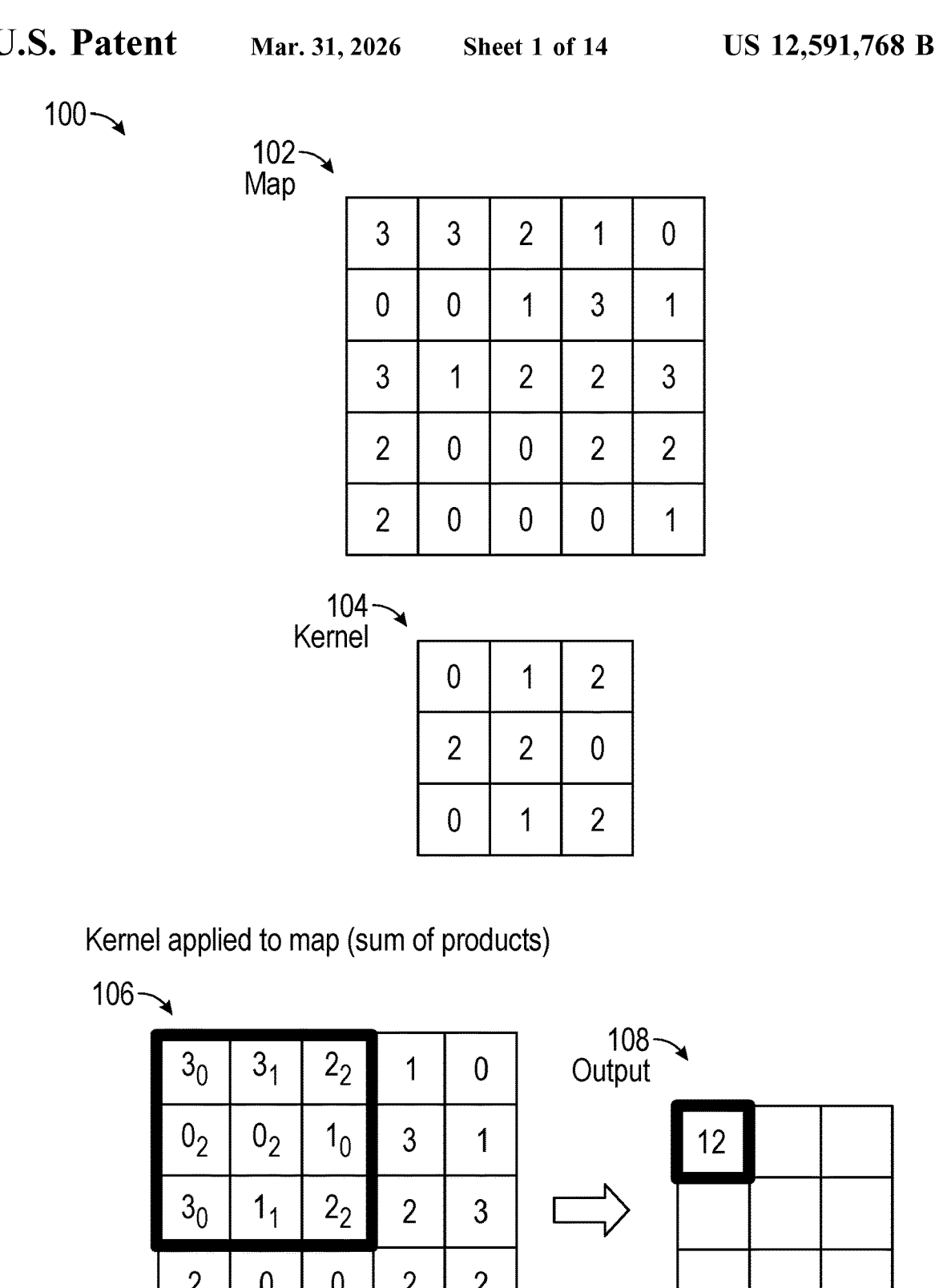
FIGS. 1A and 1B are diagrams illustrating an example of applying a kernel to a map to generate an output as part of a convolution operation of a CNN.
Figure 1B:
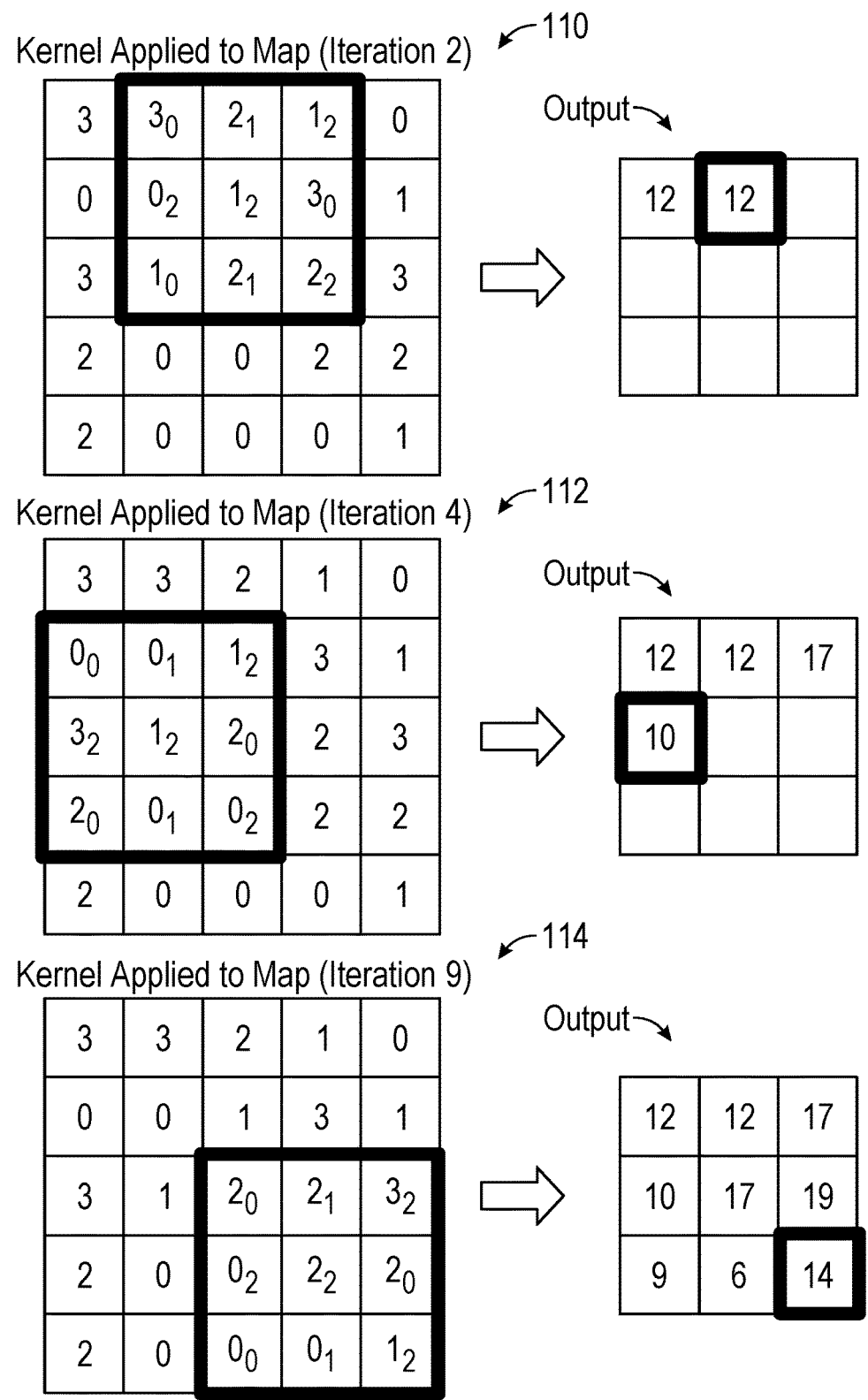

FIGS. 1A and 1B are diagrams illustrating an example 100 of applying a kernel to a map to generate an output as part of a convolution operation of a CNN. In a CNN, data is input to a convolutional layer (or node), transformed, and output to the next convolutional layer until a final output is generated. A map, which is sometimes called a channel, is a data structure used to represent data (e.g., map data or channel data) that is operated on by the CNN. A kernel is a data structure used to represent data (e.g., kernel data) that operates on the map data, such as to calculate an accumulative sum, as described below.

As shown by reference number 102, the map data of example 100 is represented using a 5 by 5 matrix that includes 25 values of map data (e.g., 25 map data values). In example 100, the map is a two-dimensional map. Implementations described herein are applicable to two-dimensional maps, as well as maps having a different number of dimensions (e.g., one-dimensional maps, three-dimensional maps, and so on). Two-dimensional maps are commonly used to represent image data, where each value in the two-dimensional matrix indicates a property of a pixel of an image (e.g., a pixel at a two-dimensional position, within the image, that corresponds to a position of the value within the map matrix). For example, a value (e.g., a map value) in the map matrix may indicate a brightness of a pixel, an amount of red color of the pixel, an amount of green color in the pixel, an amount of blue color in the pixel, or the like. However, maps may be used to represent data other than image data. Although FIG. 1A shows a 5 by 5 matrix for the map, implementations described herein can be applied to maps having any size. When map data is input to a neural network node or a convolutional layer of a CNN, the map data may be called input map data (of an input map).

As shown by reference number 104, the kernel data of example 100 is represented using a 3 by 3 matrix that includes 9 values of kernel data (e.g., 9 kernel data values). Although the kernel of example 100 has two dimensions, implementations described herein are also applicable to kernels having a different number of dimensions. In a CNN, a size of the kernel (e.g., a width and height of a two-dimensional kernel matrix) is less than the size of the map, and the number of dimensions of the kernel is equal to the number of dimensions of the map. A value (e.g., a kernel value) in the kernel matrix represents a weight to be applied to a map value during a convolution operation, as described below. In some cases, a kernel is designed (e.g., configured with specific values) to identify features in an image (e.g., edges, lines, shapes, or the like). In a CNN, a large number of kernels may be used to identify the features in the image. In general, a kernel may be used to identify features in data (e.g., image data or other data). Although FIG. 1A shows a 3 by 3 matrix for the kernel, implementations described herein can be applied to kernels having any size.

As shown by reference number 106, the kernel is applied to the map to perform a convolution operation. As shown, the kernel, which has a smaller size than the map, is applied to a portion of the map having the same size as the kernel (in this example, a 3 by 3 portion of the map). For example, the kernel may initially be applied such that a "first" value of the kernel (e.g., a value of $k_{1,1}$, which indicates a kernel value in row 1 and column 1 of the kernel, or in the top left position of the kernel matrix) is applied to a "first" value of the map (e.g., a value of $m_{1,1}$, which indicates a map value in row 1 and column 1 of the map, or in the top left position of the map matrix). When applying the kernel to the map portion, each kernel value is multiplied with a map value having a position, within the portion of the map matrix, that corresponds to a position of the kernel value within the kernel matrix. This is sometimes called elementwise multiplication (where a kernel value is an element of a kernel matrix and a map value is an element of the map matrix). The resulting values (e.g., the multiplicative products) of these multiplication operations are then summed to generate an output value.

For example, when the kernel 104 shown in FIG. 1A is applied to the map 102 shown in FIG. 1A during a first step of the convolution operation (e.g., where $k_{r,c}$ is applied to $m_{r,c}$, where r represents a row of a matrix and c represents a column of the matrix), the sum of products is calculated by $(3\times0)+(3\times1)+(2\times2)+(0\times2)+(0\times2)+(1\times0)+(3\times0)+(1\times1)+(2\times2)=12$. The value of 12 is the output of this step of the convolution operation. As shown by reference number 108, the output value is part of an output matrix. The output matrix represents the output from the convolution operation performed by applying the kernel to the map. In example 100, the output matrix has the same size and number of dimensions as the kernel (e.g., a 3 by 3 matrix).

As shown in FIG. 1B, and by reference number 110, during a second step of the convolution operation, $k_{r,c}$ is applied to $m_{r,c}+1$. In other words, the kernel shifts one column to the right, and is applied to corresponding map values. In the second step, the sum of products is calculated by $(3\times0)+(2\times1)+(1\times2)+(0\times2)+(1\times2)+(3\times0)+(1\times0)+(2\times1)+(2\times2)=12$. This output value of 12 is included in a corresponding position of the output matrix, as shown in FIG. 1B.

As shown by reference number 112, during a fourth step of the convolution operation (the third step is not shown), $k_{r,c}$ is applied to $M_{r+1,c}$. In other words, the kernel shifts one column to the right for the third step, and then shifts down one row and back to the first (leftmost) column for the fourth step. In the fourth step, the sum of products is calculated by $(0\times0)+(0\times1)+(1\times2)+(3\times2)+(1\times2)+(2\times0)+(2\times0)+(0\times1)+(0\times2)=10$. This output value of 10 is included in a corresponding position of the output matrix, as shown in FIG. 1B.

As shown by reference number 114, during a ninth step of the convolution operation (the fifth step through the eighth step are not shown), $k_{r,c}$ is applied to $M_{r+2,c+2}$. In other words, the kernel shifts one column to the right for each step until the kernel has been applied to the rightmost column of the map, and then shifts down one row and back to the first (leftmost) column for the next step before continuing to shift one column to the right for each step. In the ninth step, the sum of products is calculated by $(2\times0)+(2\times1)+(3\times2)+(0\times2)+(2\times2)+(2\times0)+(0\times0)+(0\times1)+(1\times2)=14$. This output value of 14 is included in a corresponding position of the output matrix, as shown in FIG. 1B.

As indicated above, FIGS. 1A and 1B are provided as examples. Other examples may differ from what is described with regard to FIGS. 1A and 1B.

Figure 2:
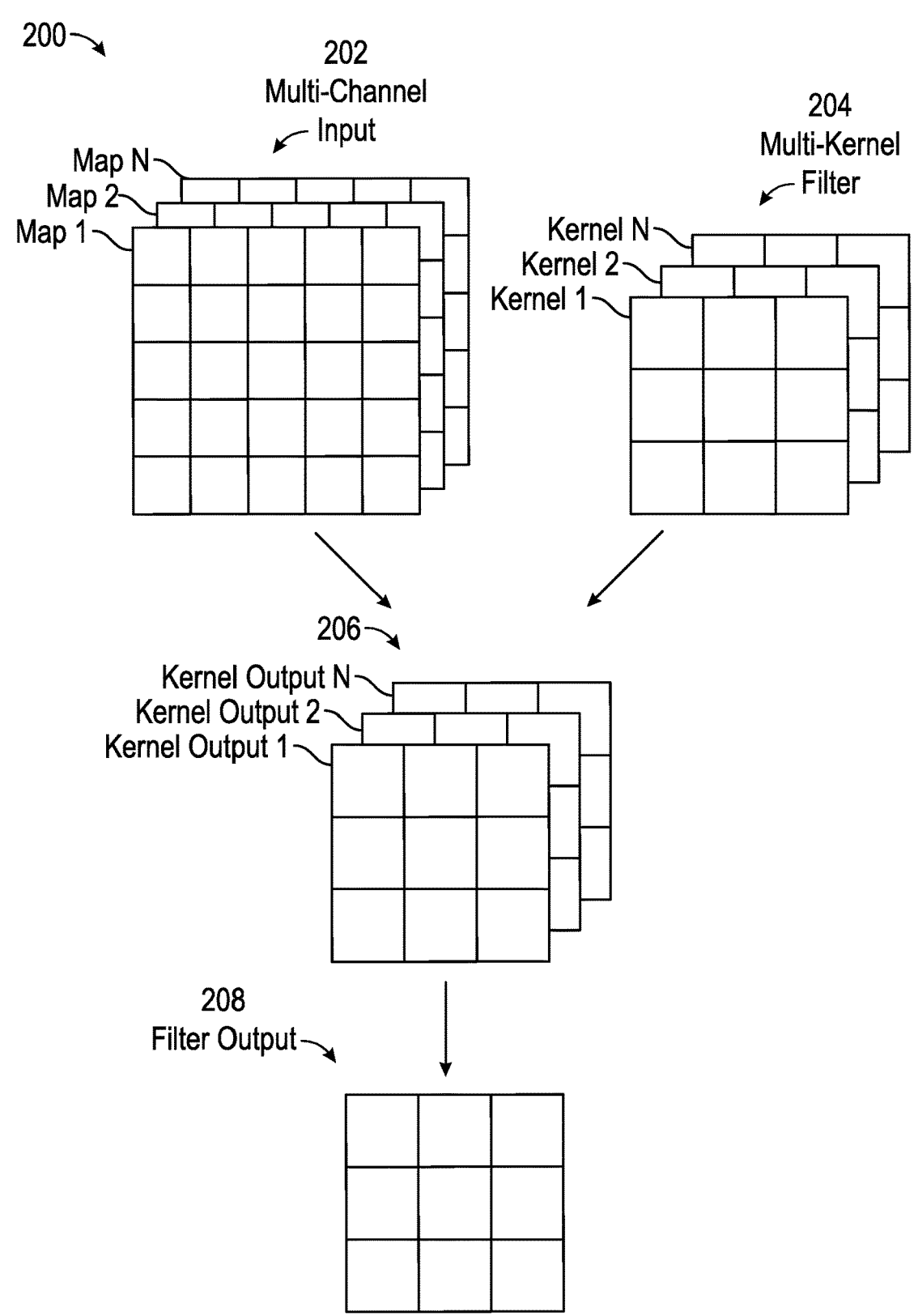
FIG. 2 is a diagram illustrating an example of applying a multi-kernel filter to a multi-channel input to generate an output as part of a convolution operation of a CNN.

FIG. 2 is a diagram illustrating an example 200 of applying a multi-kernel filter to a multi-channel input to generate an output as part of a convolution operation of a CNN. As shown by reference number 202, an input to a CNN (or to one or more layers of the CNN) may be a multi-channel input that includes multiple maps (or channels), shown as Map 1, Map 2, . . . , Map N. Each map in the multi-channel input may include a different combination of map values, and may include map data indicative of a different characteristic of input data. For example, when the input data is image data, a first map may include map data indicative of an amount of red color in pixels of an image, a second map may include map data indicative of an amount of green color in the pixels of the image, a third map may include map data indicative of an amount of blue color in the pixels of the image, a fourth map may include map data indicative of brightness of the pixels of the image, and so on.

As shown by reference number 204, a filter may be a multi-kernel filter that includes multiple kernels, shown as Kernel 1, Kernel 2, . . . , Kernel N. Each kernel in the multi-kernel filter may include a different combination of kernel values. As shown, the number of kernels included in the filter (e.g., N) may be equal to the number of channels or maps included in the multi-channel input (e.g., also N). In some implementations, each kernel may be applied to a single map (e.g., a corresponding map) of the multi-channel input, and each map may be operated on by a single kernel (e.g., a corresponding kernel) of the multi-kernel filter.

As shown by reference number 206, as part of a convolution operation, each kernel is applied to a corresponding map to produce a corresponding output (shown as kernel outputs), such as by using the technique described above in connection with FIG. 1A and FIG. 1B. For example, Kernel 1 may be applied to Map 1 to generate Kernel Output 1, Kernel 2 may be applied to Map 2 to generate Kernel Output 2, and so on. The number of kernel outputs (e.g., N) at this stage of the convolution operation is equal to the number of kernels in the filter and the number of maps (or channels) in the multi-channel input.

As shown by reference number 208, the kernel outputs may be summed to generate a filter output. The filter output is a single filter matrix with a same size as the kernel outputs. For example, the filter output may be generated by performing elementwise addition of the elements of the kernel outputs. For example, an element in the first row and the first column of Kernel Output 1 (e.g., $e_{1,1}$ in Kernel Output 1), an element in the first row and the first column of Kernel Output 2 (e.g., $e_{1,1}$ in Kernel Output 2), and so on, through an element in the first row and the first column of Kernel Output N (e.g., $e_{1,1}$ in Kernel Output N) may be summed to generate an element in the first row and the first column of the filter output (e.g., $e_{1,1}$ in the filter output). A similar summation may be performed for each set of corresponding elements (e.g., in the same row and column) in the kernel outputs to generate the corresponding element (e.g., in the same row and column) in the filter output.

Thus, each multi-kernel filter applied to a multi-channel input produces a single filter output. In some implementations, a bias may be added to the filter output, such as by adding a bias value to each element of the filter output to produce a biased filter output. In some implementations, the filter output (e.g., a biased filter output or an unbiased filter output) may be input to an activation function that applies one or more values to the filter output and/or that performs one or more operations (e.g., mathematical operations) on the filter output to generate a convolutional layer output. The convolutional layer output may be input into a subsequent convolutional layer with the convolutional layer output being treated as an input for that convolutional layer. Thus, the convolutional layer output may be treated as a map for a subsequent convolution operation. Although the filter output is shown as having a smaller size (e.g., 3 by 3) as compared to a size of the input maps (e.g., 5 by 5), various techniques or operations may be performed to generate a filter output with a same size as the input maps, such as padding the input maps or using a different filter size.

Devices and methods described herein enable the operations described in connection with FIG. 1A, FIG. 1B, and FIG. 2 to be performed at different levels of precision (e.g., 8 bits or 16 bits) using the same device architecture. Furthermore, devices and methods described herein use parallel processing to enable these operations to be performed in less time as compared to serial processing and some other parallel processing techniques. Furthermore, devices and methods described herein enable parallel processing to be controlled according to a coordination mode (e.g., an independent mode or a cooperative mode), which can result in faster processing depending on characteristics of the map data or the kernel data (e.g., map values, kernel values, map size, kernel size, a number of maps, a number of kernels, and/or a number of filters).

As indicated above, FIG. 2 is provided as an example. Other examples may differ from what is described with regard to FIG. 2.

Figure 3:
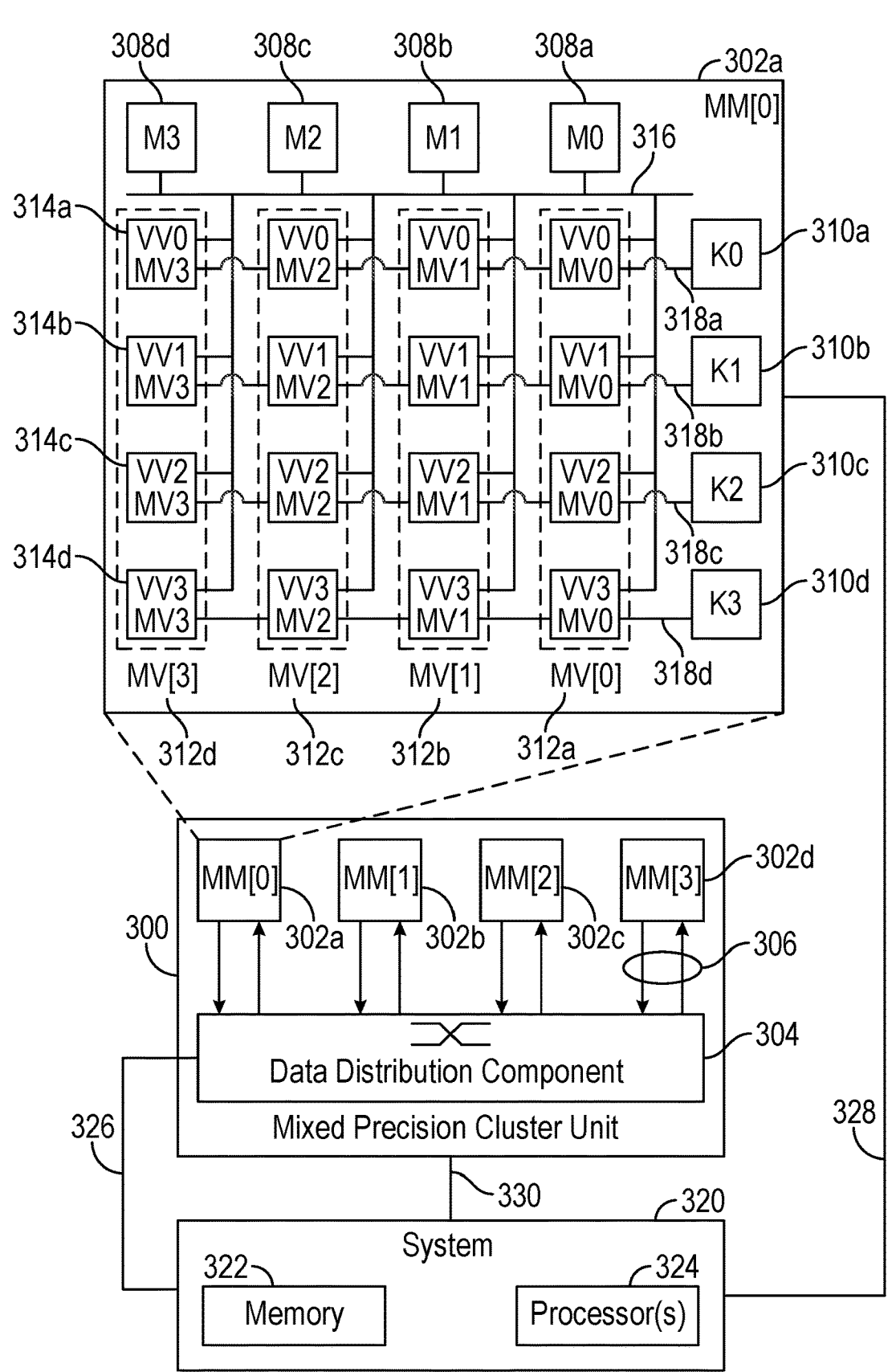
FIG. 3 is a diagram illustrating an example device for deep learning acceleration with mixed precision.

FIG. 3 is a diagram illustrating an example device 300 for deep learning acceleration with mixed precision. As shown in FIG. 3, the device 300 may be called a mixed precision cluster unit. In some implementations, the device 300 is implemented as an application-specific integrated circuit (ASIC). The device 300 includes hardware components configured to perform operations described herein.

As shown in FIG. 3, the device 300 may include multiple matrix-matrix (MM) components 302, shown as a first MM component 302a or MM[0], a second MM component 302b or MM[1], a third MM component 302c or MM[2], and a fourth MM component 302d or MM[3]. Each MM component 302 is coupled with a data distribution (DD) component 304. For example, each MM component 302 may be coupled with the DD component 304 via one or more buses 306. A bus, as used herein, may include a wire or another connection to enable data to be transmitted between components. For example, the bus 306 may include a wire or another connection to enable data to be transmitted from an MM component 302 to the DD component 304 and/or from the DD component 304 to the MM component 302.

FIG. 3 shows details of an example MM component 302a. As shown, the MM component 302a includes multiple map memory components 308, shown as a first map memory component 308a or M0, a second map memory component 308b or M1, a third map memory component 308c or M2, and a fourth map memory component 308d or M3. Each map memory component 308 is configured to store map data, such as the example map data described above in connection with FIG. 1A, FIG. 1B, and FIG. 2.

As further shown, the MM component 302a includes multiple kernel memory components 310, shown as a first kernel memory component 310a or K0, a second kernel memory component 310b or K1, a third map kernel component 310c or K2, and a fourth kernel memory component 310d or K3. Each kernel memory component 310 is configured to store kernel data, such as the example kernel data described above in connection with FIG. 1A, FIG. 1B, and FIG. 2.

As further shown, the MM component 302a includes multiple matrix-vector (MV) components 312, shown as a first MV component 312a or MV0, a second MV component 312b or MV1, a third MV component 312c or MV2, and a fourth MV component 312d or MV3. In some implementations, each MV component 312 included in an MM component 302 is coupled with all of the map memory components 308 included in that MM component 302 and is coupled with all of the kernel memory components 310 included in that MM component 302.

Each MV component 312 includes multiple vector-vector (VV) components 314, shown as VV0, VV1, VV2, and VV3 for each MV component 312. For example, MV component 312d includes a first VV component 314a, a second VV component 314b, a third VV component 314c, and a fourth VV component 314d. In some implementations, each VV component 314, of the VV components 314 included in a particular MV component 312, is coupled with each map memory component 308 of the map memory components 308a, 308b, 308c, and 308d (e.g., is coupled with every map memory component 308 included in a particular MM component, such as MM component 302a, that includes the particular MV component 312). In some implementations, each VV component 314, of the VV components 314 included in a particular MV component 312, is coupled with a single kernel memory component 310 of the kernel memory components 310a, 310b, 310c, and 310d (e.g., is coupled with a single kernel memory component 310 of the kernel memory components 310 included in a particular MM component, such as MM component 302a, that includes the particular MV component 312). Thus, each kernel memory component 310, included in a particular MM component 302, may be coupled with a single VV component 314 in each MV component 312 included in the particular MM component 302.

For example, the first VV component 314a of the MV component 312d is coupled with all of the map memory components 308a, 308b, 308c, and 308d, and is coupled with only the first kernel memory component 310a (out of the kernel memory components 310a, 310b, 310c, and 310d). Similarly, the second VV component 314b of the MV component 312d is coupled with all of the map memory components 308a, 308b, 308c, and 308d, and is coupled with only the second kernel memory component 310b. Similarly, the third VV component 314c of the MV component 312d is coupled with all of the map memory components 308a, 308b, 308c, and 308d, and is coupled with only the third kernel memory component 310c. Similarly, the fourth VV component 314d of the MV component 312d is coupled with all of the map memory components 308a, 308b, 308c, and 308d, and is coupled with only the fourth kernel memory component 310d. This enables each VV component 314 to receive any map data (e.g., stored in any of the map memory components 308) and to apply a single kernel (e.g., obtained from a single kernel memory component 310) to that map data.

As further shown in FIG. 3, a map data bus 316 (sometimes called a shared bus) may connect every VV component 314, included in a particular MM component 302, with every map memory component 308 included in that particular MM component 302. Additionally, or alternatively, each kernel data bus 318 may connect an individual VV component 314, included in a particular MV component 312, to a corresponding individual kernel memory component 310 included in the particular MM component 302 such that each individual VV component 314, included in the particular MV component 312, is connected to a different kernel memory component 310. In the MM component 302a, a first kernel data bus 318a connects VV0 of each MV component to the first kernel memory component 310a, a second kernel data bus 318b connects VV1 of each MV component to the second kernel memory component 310b, a third kernel data bus 318c connects VV2 of each MV component to the third kernel memory component 310c, and a fourth kernel data bus 318d connects VV3 of each MV component to the fourth kernel memory component 310d.

In some implementations, a kernel data bus 318 that connects to a kernel memory component 310 may pass (e.g., extend) through a VV component 314 to connect one or more other VV components 314 (e.g., in addition to the VV component 314) to the kernel memory component 310. For example, the first kernel data bus 318a connects VV0 of the first MV component 312a to the first kernel memory component 310a, passes through VV0 of the first MV component 312a to connect VV0 of the second MV component 312b to the first kernel memory component 310a, passes through VV0 of the second MV component 312b to connect VV0 of the third MV component 312c to the first kernel memory component 310a, and passes through VV0 of the third MV component 312c to connect VV0 of the fourth MV component 312d to the first kernel memory component 310a. In this way, an amount of wiring may be reduced.

The DD component 304 may be configured to load map data into the map memory components 308 of each MM component 302. For example, the DD component 304 may be configured to load map data into the map memory components 308 based on data received from one or more of the MM components 302, based on data received as an output from a max pooling operation (e.g., performed by the device 300 and/or a max pool component of the device 300), and/or based on load data (sometimes called external map data) received from a system 320, as described in more detail elsewhere herein.

In some implementations, the DD component 304 may be configured to receive external map data from the system 320. The system 320 may include a memory 322 and/or a processor 324. The memory 322 may be configured to store map data, kernel data, and/or control data that may be used to control operation of the device 300 (e.g., a precision mode, a coordination mode, a truncation point, or the like). The processor 324 may be configured to provide one or more instructions to the device 300 to control operation of the device 300. In some implementations, the one or more instructions may be based on input from a software program executing on the system 320 and/or based on user input to the system 320. Additionally, or alternatively, the DD component 304 may be configured to output processed map data (e.g., processed by one or more MM components 302) to the system 320 for storage in the memory 322.

As shown, the system 320 (as well as the memory 322 and the processor 324) may be separate from or external from the device 300 (e.g., the DD component 304 and the MM components 302). For example, the device 300 may be integrated into a chip package, and the system 320 may be separate from that chip package. In some implementations, the device 300 and the system 320 may be different chip packages on a board (e.g., a circuit board or a wafer). Thus, in some implementations, the device 300 and the system 320 may be components of another apparatus or system that includes the device 300 and the system 320.

The device 300 may be configured to communicate with the system 320 via one or more buses. For example, the device 300 may be configured to communicate with the system 320 via a DD component bus 326. The DD component bus 326 connects the DD component 304 and the system 320. The DD component 304 may be configured to receive external map data from the memory 322 via the DD component bus 326, and may be configured to determine whether to provide the external map data or other map data (e.g., based on output from one or more of the MM components 302) to the MM components 302 to populate the map memory components 308, as described in more detail elsewhere herein. Additionally, or alternatively, the DD component 304 may be configured to output processed map data to the memory 322 via the DD component bus 326.

Additionally, or alternatively, the device 300 may be configured to communicate with the system 320 via one or more MM component buses 328. An MM component bus 328 connects an MM component 302 and the system 320. An MM component 302 may be configured to receive kernel data from the memory 322 via an MM component bus 328 to populate the kernel memory components 310. In some implementations, each MM component 302 is connected to the system 320 via a separate MM component bus 328.

In some implementations, the DD component 304 may be configured to receive control data from the system 320 (e.g., an indication of a precision mode, an indication of a coordination mode, and/or one or more control signals, as described elsewhere herein) via the DD component bus 326.

Similarly, an MM component 302 may be configured to receive control data (e.g., an indication of a precision mode, an indication of a coordination mode, an indication of a truncation point, and/or one or more control signals, as described in more detail elsewhere herein) from the system 320 via an MM component bus 328. Alternatively, the device 300 may be configured to receive control data from the system 320 via a control bus 330. The control bus 330 may be configured to provide control data from the system 320, and the device 300 may be configured to provide the control data to both the DD component 304 and the MM components 302.

Regardless of the bus configuration, the device 300 may be configured to receive, from the system 320, a value that indicates an input precision mode and/or a value that indicates an output precision mode. The input precision mode indicates a word length for input data (e.g., map data and/or kernel data) that is input to the device 300 and/or that is input to one or more components of the device 300 (e.g., the DD component 304, an MM component 302, an MV component 312, or a VV component 314). The word length for the input data is sometimes called an input word length. For example, the input precision mode may indicate a word length for map data and/or kernel data received from a map memory component 308 and/or a kernel memory component 310, respectively. The output precision mode indicates a word length for output data (e.g., processed map data or processed output data) that is output from the device 300 and/or that is output from one or more components of the device 300 (e.g., the DD component 304, an MM component 302, an MV component 312, or a VV component 314). The word length for the output data is sometimes called an output word length. The DD component 304 and/or the MM components 302 (and/or sub-components of the MM components 302, such as the MV components 312 and/or the VV components 314) may be configured to operate based on the input precision mode and/or the output precision mode, as described in more detail elsewhere herein. Each device or component that receives an indication of the input precision mode may include an input precision mode port. Each device or component that receives an indication of the output precision mode may include an output precision mode port. In some implementations, the input precision mode port is a 1-bit port. Additionally, or alternatively, the output precision mode port may be a 1-bit port.

In the example of FIG. 3, the device 300 includes four MM components 302, four map memory components 308 per MM component 302, four kernel memory components 310 per MM component 302, four MV components 312 per MM component 302, and four VV components 314 per MV component 312. In some implementations, the device 300 may include a number of MM components 302 other than four, such as two, eight, or sixteen. Additionally, or alternatively, each MM component 302 may include a number of map memory components 308 other than four (e.g., two, eight, or sixteen), a number of kernel memory components 310 other than four (e.g., two, eight, or sixteen), and/or a number of MV components 312 other than four (e.g., two, eight, or sixteen). Additionally, or alternatively, each MV component 312 may include a number of VV components 314 other than four, such as two, eight, or sixteen. In some implementations, the number of map memory components 308 included in an MM component 302, the number of kernel memory components 310 included in the MM component 302, the number of MV components 312 included in the MM component 302, and the number of VV components

314 included in an MV component 314 of the MM component 302 may be the same number.

FIG. 3 shows components of a single MM component 302a of the device 300. The other MM components 302 included in the device 300 may be substantially identical to the MM component 302a. For example, each MM component 302 included in the device 300 may include substantially identical components in a substantially identical configuration as the components and configuration shown and described in connection with the MM component 302a.

The devices and components described herein (e.g., in connection with FIGS. 3-11) are hardware components, such as circuitry, logic circuitry, one or more integrated circuits, or the like. The map memory components 308 are hardware components that include circuitry, such as memory circuitry configured to store data (e.g., caches, memory banks, or the like). For example, a map memory component 308 may include volatile memory, such as random-access memory (RAM), which may include static RAM (SRAM), dynamic RAM (DRAM), or the like. Similarly, the kernel memory components 310 are hardware components that include circuitry, such as memory circuitry configured to store data. For example, a kernel memory component 310 may include volatile memory, such as RAM, which may include SRAM, DRAM, or the like. The MM components 302, the DD component 304, the MV components 312, and the VV components 314 (and sub-components of each of these components) are hardware components that include circuitry, such as logic circuitry. The memory 322 includes volatile memory and/or non-volatile memory (e.g., flash memory, read-only memory (ROM), erasable programmable ROM, electrically erasable programmable ROM, or the like). The processor 324 includes one or more processors, such as a central processing unit, a graphics processing unit, or the like. The buses described in connection with FIGS. 3-11 may be physical wires or logical buses that include one or more physical wires.

As indicated above, FIG. 3 is provided as an example. Other examples may differ from what is described with regard to FIG. 3.

Figure 4A:
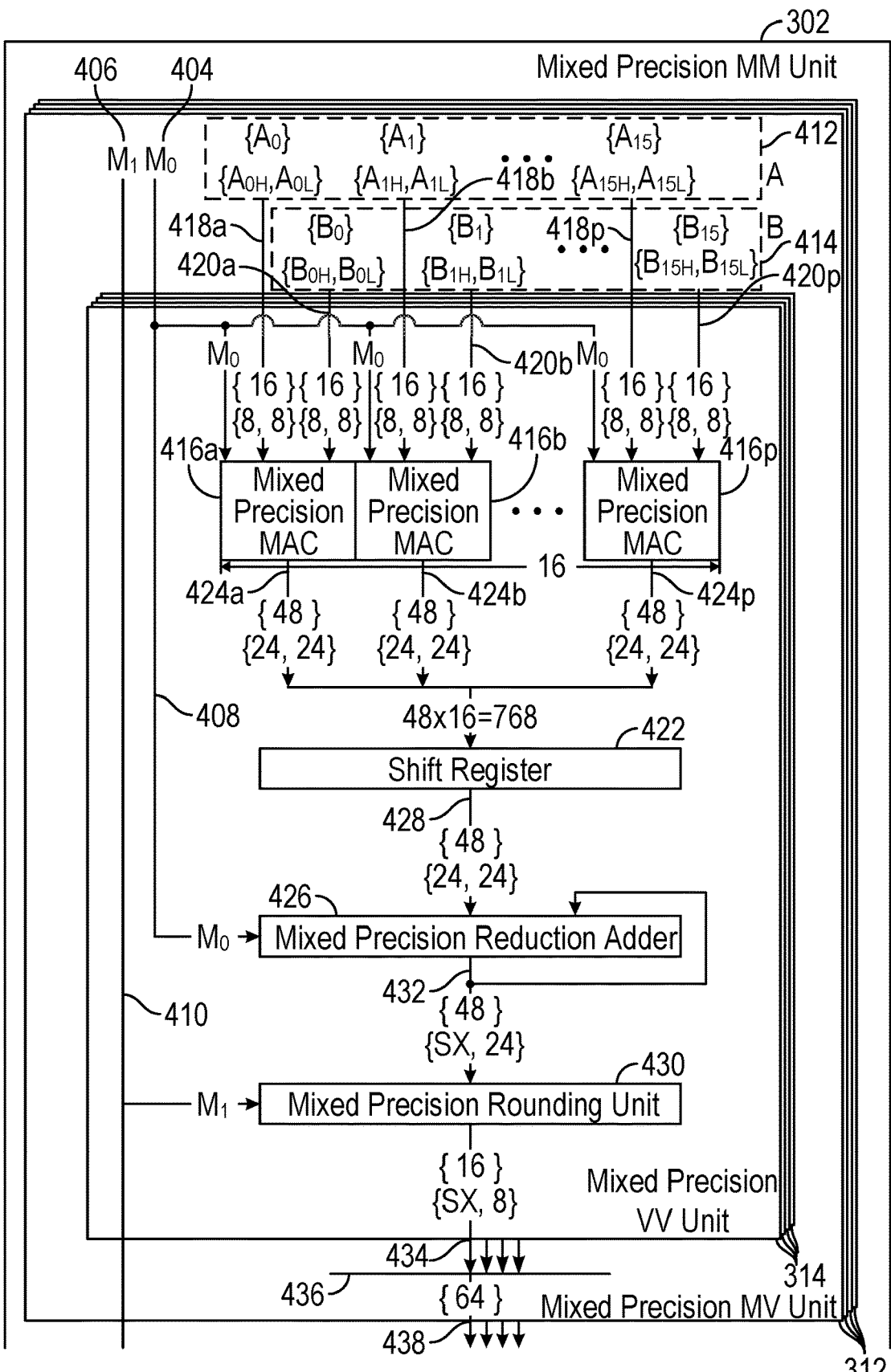
FIGS. 4A and 4B are diagrams illustrating an example matrix-matrix (MM) component for deep learning acceleration with mixed precision.
Figure 4B:
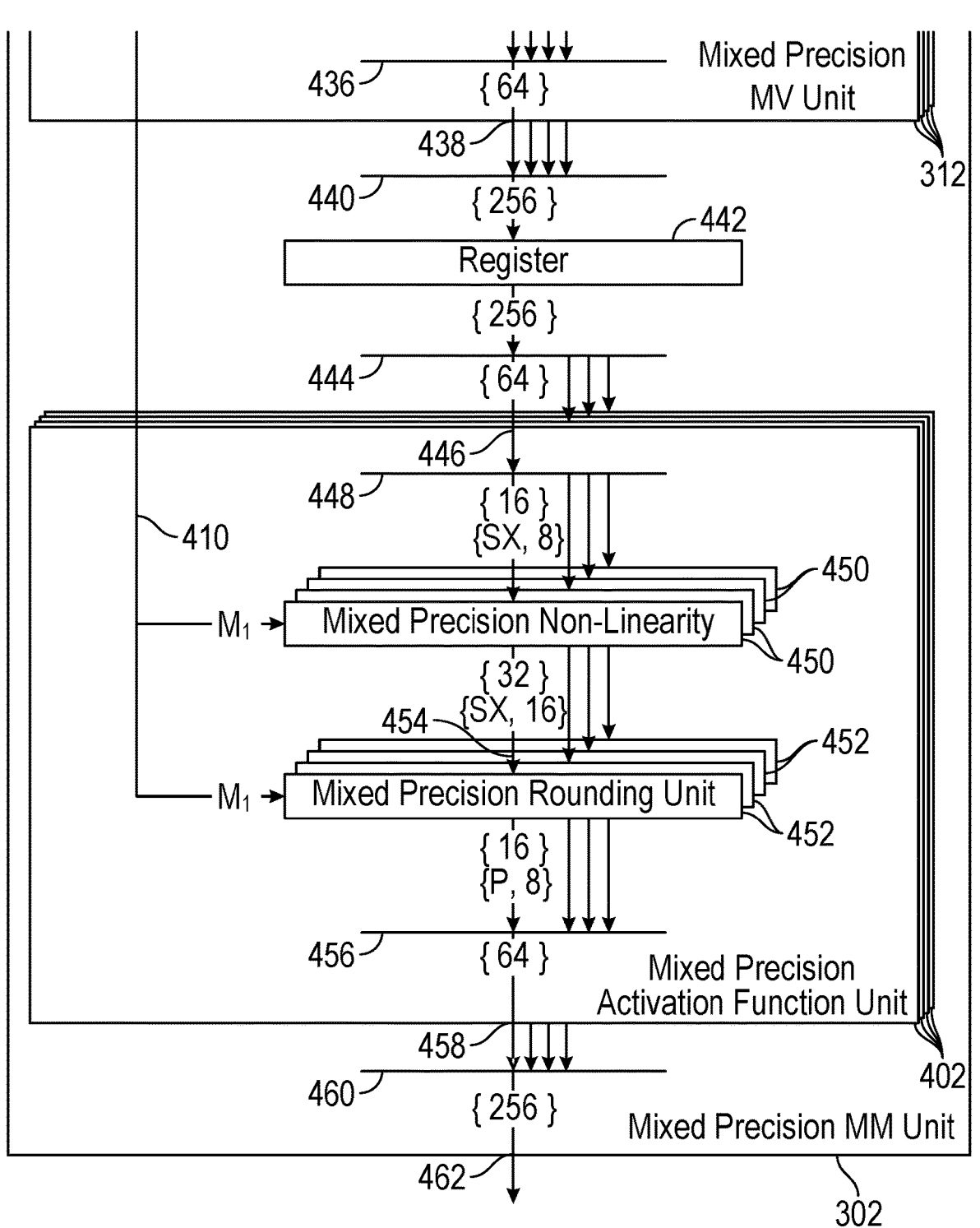

FIGS. 4A and 4B are diagrams illustrating an example MM component 302 for deep learning acceleration with mixed precision. As described above in connection with FIG. 3, the MM component 302 may be a device that is included in (e.g., that is a component of) the device 300, and the device 300 may include multiple MM components 302. As shown in FIGS. 4A and 4B, the MM component 302 may be called a mixed precision MM unit. The MM component 302 includes hardware components configured to perform operations described herein.

As shown in FIGS. 4A and 4B, and as described above in connection with FIG. 3, the MM component 302 includes multiple (e.g., four) MV components 312, which may be called mixed precision MV units. As further shown in FIGS. 4A and 4B, and as described above in connection with FIG. 3, each MV component 312 includes multiple (e.g., four) VV components 314, which may be called mixed precision VV units. As further shown in FIGS. 4A and 4B, the MM component 302 includes multiple (e.g., four) activation function (AF) components 402, which may be called mixed precision activation function units.

As shown in FIG. 4A, an input precision mode port 404 (sometimes called a first precision mode port of a VV component 314) may be configured to receive an indication (e.g., via a value or a signal) of an input precision mode that indicates a word length for data (e.g., map data and/or kernel data) to be operated on (e.g., by the VV component 314), sometimes called an input word length (and shown as $M_0$). As further shown, an output precision mode port 406 (sometimes called a second precision mode port of a VV component 314) may be configured to receive an indication of an output precision mode that indicates a word length for data (e.g., map data and/or kernel data) to be output (e.g., from the VV component 314), sometimes called an output word length (and shown as $M_1$). An input precision mode bus 408 may be configured to carry the indication of the input precision mode to various components (e.g., one or more components of the VV component 314). An output precision mode bus 410 may be configured to carry the indication of the output precision mode to various components (e.g., one or more components of the VV component 314 and/or the AF component 402). In some implementations, each VV component 314 includes an input precision mode port 404 (sometimes called a VV input precision mode port) and/or an output precision mode port 406 (sometimes called a VV output precision mode port).

In some implementations, an input precision mode and/or an output precision mode of each VV component 314 may be separately controlled, and different VV components 314 may be capable of operating concurrently using different precision modes. In these implementations, each VV component 314 may have a separate connection (e.g., via a precision mode port and a dedicated control bus) to the system 320 to receive control data indicating a precision mode for an individual VV component 314. For example, an input precision mode port 404 of a VV component 314 may independently connect with the system 320 (e.g., via a dedicated control bus), and/or an output precision mode port 406 of a VV component 314 may independently connect with the system 320.

Alternatively, each VV component 314 may be jointly controlled, and different VV components 314 may be required to operate concurrently using the same precision modes. In these implementations, each VV component 314 may have a shared connection (e.g., via a corresponding precision mode port and a shared control bus) to the system 320 to receive control data indicating a precision mode for a group of VV components 314. For example, input precision mode ports 404 of multiple VV components 314 may connect to a shared bus that connects with the system 320, and/or output precision mode ports 406 of multiple VV components 314 may connect to a shared bus that connects with the system 320.

In some implementations, a coordination mode port (not shown) may be configured to receive a value that indicates a coordination mode to be used for operations of a VV component 314. The coordination mode impacts operations across VV components 314 and MM components 302, and thus all of the VV components 314 and MM components 302 may operate according to the same coordination mode. Thus, in some implementations, each VV component 314 may have a shared connection (e.g., via a corresponding coordination mode port and a shared control bus) to the system 320 to receive control data indicating a coordination mode for a group of VV components 314. For example, coordination mode ports of multiple VV components 314 may connect to a shared bus that connects with the system 320. The value that indicates the coordination mode may be carried to one or more components of a VV component 314 (e.g., an adder component 426, described below) via a coordination mode bus (not shown). In some implementations, the coordination mode port (and other coordination mode ports described herein) may be a 1-bit port.

Although some implementations described herein include a coordination mode port configured to receive an indication of a coordination mode, in some implementations, the system 320 may receive the indication of the coordination mode and may use that indication to generate a control signal. The system 320 may provide the control signal to one or more components (e.g., via the coordination mode port or a control port) to control operations of the one or more component based on the coordination mode.

As further shown in FIG. 4A, each VV component 314 may include a set of (one or more) map data ports 412 (sometimes called a set of VV map data ports or a set of first data ports of a VV component 314) and/or a set of (one or more) kernel data ports 414 (sometimes called a set of VV kernel data ports or a set of second data ports of a VV component 314). A map data port 412 may be configured to receive map data (shown as A). For example, a map data port 412 may be configured to receive map data from a map memory component 308. A kernel data port 414 may be configured to receive kernel data (shown as B). For example, a kernel data port 414 may be configured to receive kernel data from a kernel memory component 310.

In some implementations, a VV component 314 may include a single map data port 412 and may be configured to divide input map data, received via the single map data port 412, into multiple map data segments. The input map data may have an input bit length, and the multiple map data segments may each have a shorter bit length than the input bit length. Each map data segment may have the same bit length, may consist of a series of consecutive bits, and/or may include a mutually exclusive set of bits. For example, in some implementations, the input bit length is 256 bits (e.g., the map data port 412 may be a 256-bit port). The VV component 314 may be configured to divide the input map data into Z map data segments (e.g., sixteen map data segments, as shown), with each map data segment having a bit length of 256 divided by Z (e.g., 256 bits divided by 16 segments=16 bits per segment). A first map data segment $\{A_0\}$ or $\{A_{0H}, A_{0L}\}$ may include the first 16 input map data bits, a second map data segment $\{A_1\}$ or $\{A_{1H}, A_{1L}\}$ may include the next 16 input map data bits, and so on, and a last map data segment$\{A_{15}\}$ or $\{A_{15H}, A_{15L}\}$ may include the last 16 input map data bits.

Alternatively, the MV component 312 may include a single map data port 412 per VV component 314, and may be configured to operate on the input map data to generate the map data segments. In this case, a VV component 314 may include multiple map data ports 412 (e.g., Z map data ports 412), and each map data port 412 may be configured to receive a map data segment.

Similarly, a VV component 314 may include a single kernel data port 414 and may be configured to divide input kernel data, received via the single kernel data port 414, into multiple kernel data segments. The input kernel data may have an input bit length, and the multiple kernel data segments may each have a shorter bit length than the input bit length. Each kernel data segment may have the same bit length, may consist of a series of consecutive bits, and/or may include a mutually exclusive set of bits. For example, in some implementations, the input bit length is 256 bits (e.g., the kernel data port 414 may be a 256-bit port). The VV component 314 may be configured to divide the input kernel data into Z kernel data segments (e.g., sixteen kernel data segments, as shown), with each kernel data segment having a bit length of 256 divided by Z (e.g., 256 bits divided by 16 segments=16 bits per segment). A first kernel data segment $\{B_0\}$ or $\{B_{0H}, B_{0L}\}$ may include the first 16 input kernel data bits, a second kernel data segment $\{B_1\}$ or $\{B_{1H}, B_{1L}\}$ may include the next 16 input kernel data bits, and so on, and a last kernel data segment $\{B_{15}\}$ or $\{B_{15H}, B_{15L}\}$ may include the last 16 input kernel data bits.

Alternatively, the MV component 312 may include a single kernel data port 414 per VV component 314, and may be configured to operate on the input kernel data to generate the kernel data segments. In this case, a VV component 314 may include multiple kernel data ports 414 (e.g., Z kernel data ports 414), and each kernel data port 414 may be configured to receive a kernel data segment.

As further shown in FIG. 4A, each VV component 314 may include multiple multiply-accumulate (MAC) components 416, shown as mixed precision MACs. The example VV component 314 shown in FIG. 4A includes sixteen MAC components 416, shown as MAC component 416a, MAC component 416b, . . . , MAC component 416p. Each MAC component 416 may receive a map data segment via a corresponding map data segment bus 418, shown as map data segment bus 418a, map data segment bus 418b, . . . , map data segment bus 418p. Each MAC component 416 may receive a kernel data segment via a corresponding kernel data segment bus 420, shown as kernel data segment bus 420a, kernel data segment bus 420b, . . . , kernel data segment bus 420p. Each MAC component 416 may receive the indication of the input precision mode $M_0$ via the input precision mode bus 408 and a corresponding MAC input precision mode port. In some implementations, a VV component 314 may include a number of MAC components 416 other than sixteen, such as four MAC components 416, eight MAC components 416, thirty-two MAC components 416, or sixty-four MAC components 416.

As described above, the input precision mode may indicate an input word length, such as a word length for the map data segment and for the kernel data segment. For example, a first value of the input precision mode may indicate a first input word length or a first input precision mode, and a second value of the input precision mode may indicate a second input word length or a second input precision mode. In some implementations, the first input precision mode is a 16-bit signed integer (INT16) mode. In some implementations, the second input precision mode is an 8-bit signed integer (INT8) mode. In the INT16 mode, the word length is 16 bits (e.g., 2 bytes). In the INT8 mode, the word length is 8 bits (e.g., 1 byte). In some implementations, the indication of the input precision mode is a single bit that can indicate only the first value (e.g., 0) or the second value (e.g., 1). Thus, the input precision mode port 404 (and other input precision mode ports described herein) may be a 1-bit port.

In some implementations, the device 300 (and one or more components thereof) may be capable of operating in four different operating modes. In a first operating mode, when the input precision mode is the INT16 mode and the output precision mode is the INT16 mode, the components of the device 300 perform operations on inputs in the INT16 mode and provide outputs in the INT16 mode. In a second operating mode, when the input precision mode is the INT8 mode and the output precision mode is the INT8 mode, the components of the device 300 perform operations on inputs in the INT8 mode and provide outputs in the INT8 mode. In a third operating mode, when the input precision mode is the INT16 mode and the output precision mode is the INT8 mode, the components of the device 300 perform operations on inputs in the INT16 mode and provide outputs in the INT8 mode. In a fourth operating mode, when the input precision mode is the INT8 mode and the output precision mode is the INT16 mode, the components of the device 300 perform operations on inputs in the INT8 mode and provide outputs in the INT16 mode.

Each MAC component 416 operates on map data (e.g., a map data segment) and kernel data (e.g., a kernel data segment), input into that MAC component 416, based on the input precision mode (and/or a corresponding input word length). For example, if the input precision mode indicates a first (e.g., longer) word length, then a MAC component 416 may treat the bits of the map data segment as a single map word and may treat the bits of the kernel data segment as a single kernel word. As another example, if the input precision mode indicates a second (e.g., shorter) word length, then a MAC component 416 may treat the bits of the map data segment as multiple map words (e.g., two map words) and may treat the bits of the kernel data segment as multiple kernel words (e.g., two kernel words). Thus, a map data segment may include a set of map words (e.g., one or more map words), and a kernel data segment may include a set of kernel words (e.g., one or more kernel words). In some implementations, a map data segment includes one map word or two map words. Similarly, a kernel data segment may include one kernel word or two kernel words.

As an example, the input map data may have a bit length of 256 bits, the input kernel data may have a bit length of 256 bits, each map data segment may have a length of 16 bits, and each kernel data segment may have a length of 16 bits. In this example, in the INT16 mode, each MAC component 416 treats a corresponding data segment as a 16-bit word. For example, in the INT16 mode, the MAC component 416a operates on the map data segment $\{A_0\}$ as a 16-bit map word and operates on the kernel data segment $\{B_0\}$ as a 16-bit kernel word. In this example, in the INT8 mode, each MAC component 416 treats a corresponding data segment as two 8-bit words, where the 16-bit data segment is represented by a higher (H) half of 8 bits and a lower (L) half of 8 bits. For example, in the INT8 mode, the MAC component 416a operates on the map data segment $\{A_{0H}, A_{0L}\}$ as two 8-bit map words and operates on the kernel data segment $\{B_{0H}, B_{0L}\}$ as two 8-bit kernel words. Thus, in the INT16 mode, the sixteen MAC components 416 collectively operate on sixteen 16-bit words, and in the INT8 mode, the sixteen MAC components 416 collectively operate on thirty-two 8-bit words. Additional details of operations performed by the MAC components 416 based on the input precision mode are described elsewhere herein.

As further shown in FIG. 4A, the output of each MAC component 416 (sometimes called a MAC output) is provided to a shift register 422 via corresponding MAC output buses 424. The bit length of the MAC output may be three times the bit length of the data segments input to a MAC component 416. For example, if the input to a MAC component 416 is a map data segment and a kernel data segment that are each 16 bits, then the MAC output may be 48 bits. In the INT16 mode, the 48 bits are treated as a single 48-bit value (e.g., a single 48-bit number). In the INT8 mode, the 48 bits are treated as two 24-bit values (e.g., two 24-bit numbers).

In general, a MAC output represents a sum of products. This sum of products (i.e., the MAC output) is sometimes called an accumulation of products or a product accumulation. For example, a MAC output may represent an output of applying a kernel to a portion of a map, as described above in connection with FIGS. 1A and 1B. The portion of the map may be represented by the map data segment received by the MAC component 416, and the kernel may be represented by the kernel data segment received by the MAC component 416. Additional details regarding the MAC component 416 are described below in connection with FIGS. 5-7.

In some implementations, the VV component 314 may be configured to concatenate the MAC outputs from all of the MAC components 416 to generate a concatenated MAC output that is stored in the shift register 422. In the example where the MAC outputs are 48 bits and the VV component 314 includes sixteen MAC components 416, the concatenated MAC output is 768 bits.

In some implementations, a MAC component 416 may be configured to output a corresponding MAC output based on a control signal or a control counter indicating that a threshold number of clock cycles has elapsed (e.g., that the number of elapsed clock cycles is greater than or equal to a threshold). For example, the threshold number of clock cycles may be equal to the number of MAC components 416 included in the VV component 314, or may be equal to one more than the number of MAC components 416 included in the VV component 314, as explained below. In some implementations, all of the MAC components 416 in a VV component 314 may output all of the corresponding MAC outputs in the same clock cycle (e.g., substantially simultaneously) to populate the entire shift register 422. Alternatively, a single MAC component 416 may output a corresponding MAC output in a particular clock cycle, and each individual MAC component 416 may output its corresponding MAC output in a different clock cycle to populate the shift register 422 sequentially. For example, in a particular clock cycle, the shift register 422 may be configured to output the earliest received MAC output that is still stored in the shift register 422 and may then replace the earliest received MAC output with a newly received MAC output.

The shift register 422 may be configured to temporarily store the MAC outputs received from the MAC components 416 (e.g., a concatenated MAC output). The shift register 422 may be configured to output a single MAC output, of the concatenated MAC outputs stored in the shift register 422, in a particular clock cycle. In some implementations, the shift register 422 is configured to output a different MAC output each clock cycle. For example, if the concatenated MAC output includes 16 MAC outputs that are each 48 bits (for a total of 768 bits stored in the shift register 422), then the shift register 422 may output a single 48-bit MAC output in a clock cycle. In other words, the shift register 422 may "shift out" the last 48 bits of the concatenated MAC output in a clock cycle. The shift register 422 may be configured to output the MAC output to an adder component 426, shown as a mixed precision reduction adder, via a bus 428. For example, the shift register 422 may be configured to output each MAC output (e.g., from multiple MAC components 416) across multiple clock cycles to the adder component 426 for generation of an adder component output. The bits output by the shift register 422 (e.g., 48 bits) may be treated as a single value (e.g., a single 48-bit value or number) in the INT16 mode, and may be treated as multiple values (e.g., two 24-bit values or numbers) in the INT8 mode.

The adder component 426 may be configured to add MAC outputs that are received from the shift register 422. The adder component 426 may be configured to add the MAC outputs based on an input precision mode ($M_0$), and thus may include an input precision mode port (sometimes called an adder component input precision mode port) configured to receive a value that indicates the input precision mode via the input precision mode bus 408. In some implementations, the adder component 426 may be configured to add the MAC outputs based on a coordination mode, and thus may include a coordination mode port (sometimes called an adder component coordination mode port) to receive a value that indicates the coordination mode.

The coordination mode may include, for example, a cooperative mode or an independent mode. In some implementations, a value that indicates the coordination mode may be a single bit that can indicate only a first value (e.g., 0) or a second value (e.g., 1), corresponding to a first coordination mode (e.g., the cooperative mode) or a second coordination mode (e.g., the independent mode). In these implementations, the coordination mode port is a 1-bit port. In the cooperative mode, the MAC outputs from all of the MAC components 416 are summed (e.g., with or without adding a bias) by the adder component 426 and treated as a single output value (e.g., an adder component output that is generated based on summing multiple MAC outputs). In the independent mode, the MAC outputs from different MAC components 416 are not summed together by the adder component 426. In the independent mode, the adder component 426 may add a bias to a MAC output and/or may generate the adder component output based on a single MAC output (e.g., without summing multiple MAC outputs and/or by refraining from summing multiple MAC outputs). Thus, in the independent mode, the adder component 426 may generate an output (sometimes called an adder component output) every clock cycle (e.g., a single adder component output in each clock cycle).

In the example of FIG. 4A, in the cooperative mode and the INT16 mode, the adder component 426 is configured to add sixteen 48-bit MAC outputs, received from the shift register 422 in successive clock cycles, over a period of sixteen clock cycles to generate a single 48-bit sum. In the cooperative mode and the INT16 mode, summing the sixteen 48-bit MAC outputs takes sixteen clock cycles. Thus, in the cooperative mode and the INT16 mode, the adder component 426 may generate an output every sixteen clock cycles.

In the cooperative mode and the INT8 mode, the adder component 426 is configured to add thirty-two 24-bit values, received from the shift register 422 as a pair of 24-bit values per clock cycle, over a period of sixteen clock cycles to generate a single 24-bit sum. In some implementations, in the cooperative mode and the INT8 mode, the adder component 426 is configured to perform a signed extension operation to generate the 24-bit sum with a signed extension, shown as {SX, 24}. In the cooperative mode and the INT8 mode, summing the sixteen 48-bit MAC outputs takes seventeen clock cycles. In sixteen clock cycles, the adder component 426 generates two 24-bit values, and sums these two 24-bit values to generate a single 24-bit value (e.g., with a signed extension) in the seventeenth clock cycle. Thus, in the cooperative mode and the INT8 mode, the adder component 426 may generate an output every seventeen clock cycles.

In the independent mode and the INT16 mode, the adder component 426 generates a single 48-bit adder output per clock cycle. For example, the adder component 426 may add a bias to a MAC output, received from the shift register 422, and may output the biased value (e.g., as an adder component output). In the independent mode and the INT16 mode, the adder component 426 takes a single clock cycle to process an input (e.g., a MAC output) and generate an output (e.g., to add bias to a MAC output to generate an adder component output). In the independent mode and the INT16 mode, the adder component 426 takes sixteen clock cycles to process the MAC outputs from all sixteen MAC components 416 (e.g., to add bias to each of sixteen MAC outputs).

In the independent mode and the INT8 mode, the adder component 426 generates two 24-bit adder outputs per clock cycle. For example, the adder component 426 may add a bias to one or both 24-bit MAC outputs, received from the shift register 422, and may output the biased values. In the independent mode and the INT8 mode, the adder component 426 takes a single clock cycle to process an input (e.g., a MAC output) and generate an output (e.g., to add bias to a MAC output to generate an adder component output). In the independent mode and the INT8 mode, the adder component 426 takes sixteen clock cycles to process MAC outputs from all sixteen MAC components 416 (e.g., to add biases to each of sixteen MAC outputs). In some implementations, the adder component 426 has the same components and configuration (including a return port that receives data via a return bus, as well as a demultiplexer to process outputs) as the adder component 510 described in more detail below in connection with FIG. 5 and FIG. 7. The adder component 426 may be configured to receive one or more control signals (e.g., indicative of an input precision mode and/or a coordination mode) that control whether the adder output is provided back to the adder component 426 as input (e.g., via a return port and a return bus) or is provided to a rounding component 430 (e.g., using a demultiplexer, in a similar manner as described in connection with FIG. 5).

As described above, the adder component 426 may take a single clock cycle to perform an accumulation operation when operating in the independent mode and the INT8 mode, and may take a single clock cycle to perform an accumulation operation when operating in the independent mode and the INT16 mode. When operating in the cooperative mode and the INT16 mode, the adder component 426 may take sixteen clock cycles to perform an accumulation operation. When operating in the cooperative mode and the INT8 mode, the adder component 426 may take seventeen clock cycles to perform an accumulation operation. Thus, in some implementations, the VV component 314 may include a controller (not shown) and/or one or more control buses to generate and/or provide control signals that control when the MAC components 416 provide MAC output to the shift register 422, and/or to control when the shift register 422 provides MAC outputs to the adder component 426. The controller and/or control bus(es) may provide a signal to the MAC components 416 and/or the shift register 422, and the MAC components 416 and/or the shift register 422 may provide outputs based on the signal. The controller may be configured to provide the signal based on the input precision mode and/or the coordination mode. For example, if the input precision mode is INT8 and the coordination mode is the cooperative mode, then the controller may output the signal every seventeen clock cycles. As another example, if the input precision mode is INT16 and the coordination mode is the cooperative mode, then the controller may output the signal every sixteen clock cycles. In the other mode combinations described above (e.g., in the independent mode, regardless of the precision mode), the controller may output the signal every clock cycle.

As shown in FIG. 4A, the adder component 426 may be configured to provide an adder output to a rounding component 430, shown as a mixed precision rounding unit, via a bus 432. The rounding component 430 may be configured to round the adder output (e.g., to a nearest integer value) based on the output precision mode. Thus, the rounding component 430 may include an output precision mode port configured to receive a value that indicates the output precision mode $M_1$ via the output precision mode bus 410.

As described above, the output precision mode may indicate an output word length. For example, a first value of the output precision mode may indicate a first output word length or a first output precision mode, and a second value of the output precision mode may indicate a second output word length or a second output precision mode. In some implementations, the first output precision mode is the INT16 mode. In some implementations, the second output precision mode is the INT8 mode. In some implementations, the indication of the output precision mode is a single bit that can indicate only the first value (e.g., 0) or the second value (e.g., 1). Thus, the output precision mode port 406 (and other output precision mode ports described herein) may be a 1-bit port.

In the INT16 mode, the rounding component 430 generates and outputs a rounded output that is a single 16-bit word. In the INT8 mode, the rounding component 430 performs a signed extension operation to generate the rounded output as a single 8-bit word with an 8-bit signed extension, shown as {SX, 8}. Additional details regarding the rounding component 430 are described below in connection with FIG. 8.

As shown in FIG. 4A, the rounded output generated by the rounding component 430 is the output from a VV component 314 that includes the rounding component 430. The output from a VV component 314 is sometimes called a VV output. The VV component 314 may include a VV output port 434 configured to output the VV output (e.g., the rounded output).

As described above, a MAC output represents a sum of products (e.g., a sum of a quantity of products or a sum of a number of products), sometimes called an accumulation of products or a product accumulation. The VV component 314 may be configured to generate a VV output based on the input precision mode, the output precision mode, and at least one MAC output (e.g., at least one accumulation of products or at least one product accumulation). For example, in the cooperative mode, a VV component 314 may be configured to generate the VV output as a rounded sum of multiple accumulations of products output from multiple MAC components 416 (e.g., all MAC components 416) included in that VV component 314. As another example, in the independent mode, a VV component 314 may be configured to generate the VV output as a rounded accumulation of products output by a single MAC component 416 included in that VV component 314.

In the cooperative mode, a VV output may represent a rounded sum of a number of MAC outputs (sometimes called a rounded sum of an accumulation of products), which may or may not include bias. For example, in the cooperative mode, a VV output may represent a rounded sum of MAC outputs from different MAC components 416 (e.g., one MAC output per MAC component 416 included in the VV component 314) that operate on segments of the same map data (A) and the same kernel data (B). In the independent mode, a VV output may represent a rounded MAC output (sometimes called a rounded accumulation of products), which may or may not include bias. For example, in the independent mode, a VV output may represent a rounded value of a single MAC output from a single MAC component 416 (e.g., a single MAC output that is then rounded). Thus, in some implementations, the coordination mode may indicate whether an accumulation of products (a MAC output) is to be combined (e.g., summed) with one or more other accumulations of products (one or more other MAC outputs), by the VV component 314, prior to rounding. In some cases, multiple MAC outputs may be referred to as a plurality of accumulations of products or a plurality of product accumulations.

As shown by reference number 436, an MV component 312 may be configured to concatenate the VV outputs from all of the VV components 314, included in the MV component 312, to form a concatenated VV output. Concatenation, as described herein, may be performed using multiple wires or buses that each carry a portion of a concatenated value. The concatenated value may be stored in memory, such as a register. The MV component 312 may be configured to output the concatenated VV output, as an MV output, via an MV output port 438. For example, if each VV output is 16 bits and there are four VV components 314 per MV component 312, then the MV output is 64 bits, as shown.

As shown in FIG. 4B, and by reference number 440, an MM component 302 may be configured to concatenate the MV outputs from all of the MV components 312, included in the MM component 302, to form a concatenated MV output. For example, if each MV output is 64 bits and there are four MV components 312 per MM component 302, then the concatenated MV output is 256 bits, as shown. In some implementations, the MM component 302 includes a register 442 configured to store the concatenated MV output (e.g., for a single clock cycle).

As shown by reference number 444, the MM component 302 may be configured to separate (e.g., dis-concatenate or dissociate) the individual MV outputs from the concatenated MV output, such as by fetching a portion of the concatenated MV output and providing that portion to a corresponding AF component 402 (and/or by successively fetching portions of the concatenated MV output and providing those portions to corresponding AF components 402). The MM component 302 may be configured to provide each individual MV output (e.g., from each individual MV component 312) to a corresponding AF component 402. Thus, each AF component 402 may include an AF input port 446 configured to receive an MV output. As shown, the number of AF components 402 included in an MM component 302 may be equal to the number of MV components 312 included in the MM component 302 (e.g., four in the example of FIGS. 4A and 4B). In some implementations, each AF component 402 receives an MV output from a corresponding MV component 312.

As shown by reference number 448, the AF component 402 may be configured to separate (e.g., dis-concatenate or dissociate) the individual VV outputs from the MV output (which is a concatenated VV output) received by the AF component 402. The AF component 402 may include multiple non-linearity components 450. Each of the non-linearity components 450 may be configured to receive an individual VV output (e.g., in a particular clock cycle). Thus, in some implementations, the number of non-linearity components 450 included in the AF component 402 may be equal to the number of VV components 314 included in an MV component 312 (e.g., four, in the example of FIGS. 4A and 4B).

A non-linearity component 450 may be configured to apply an activation function (e.g., a non-linear activation function) to the VV output received by the non-linearity component 450 based on the output precision mode. Thus, the non-linearity component 450 may include an output precision mode port configured to receive a value that indicates the output precision mode via the output precision mode bus 410.

In some implementations, the MM component 302, the AF component 402, and/or the non-linearity component 450 may store data in multiple tables (e.g., lookup tables), with one table for each output precision mode. For example, two tables may be stored, such as a first table for the INT16 mode and a second table for the INT8 mode. The non-linearity component 450 may be configured to select a table based on the output precision mode (e.g., select the first table for the INT16 mode and select the second table for the INT8 mode). The non-linearity component 450 may be configured to perform a lookup in the selected table, using the VV output received by the non-linearity component 450, to identify an AF value associated with the VV output in the selected table. Thus, in some implementations, the non-linearity component 450 may apply the activation function to the VV output by performing the table lookup described above.

Alternatively, the non-linearity component 450 may be configured to apply a different activation function to the VV output, received by the non-linearity component 450, based on the output precision mode. For example, the non-linearity component 450 may be configured to apply a first activation function to the VV output in the INT16 mode, and may be configured to apply a second activation function to the VV output in the INT8 mode. The value generated by the non-linearity component 450 (e.g., based on performing a table lookup and/or applying an activation function) may be called an AF value. In some implementations, the non-linearity component 450 may be configured to look up a value in a table that is selected based on the output precision mode and may be configured to use that value in an activation function applied to the VV output to generate the AF value.

In some implementations, the AF value may include more bits than the VV output. For example, the AF value may include two times the number of bits as the VV output. In the example of FIGS. 4A and 4B, the VV output is 16 bits and the AF value is 32 bits. In the INT16 mode, the VV output represents a single 16-bit value, and the AF value represents a single 32-bit value. In the INT8 mode, the VV output represents a single 8-bit value with an 8-bit signed extension (shown as SX), and the AF value represents a single 16-bit value with a 16-bit signed extension. The non-linearity component 450 may be configured to output the AF value to a rounding component 452 (sometimes called an AF rounding component, and shown as a mixed precision rounding unit) via a bus 454.

The rounding component 452 may be configured to round the AF value (e.g., to a nearest integer value) based on the output precision mode. Thus, the rounding component 452 may include an output precision mode port configured to receive a value that indicates the output precision mode $M_1$ via the output precision mode bus 410. In the INT16 mode, the rounding component 452 is configured to generate and output a rounded AF value that is a single 16-bit word. In the INT8 mode, the rounding component 452 is configured to perform a signed extension operation to generate the rounded AF value as a single 8-bit word with an 8-bit signed extension or with 8 bits of padding, shown as $\{P, 8\}$. Additional details regarding the rounding component 452 are described below in connection with FIG. 8.

As shown in FIG. 4B, each non-linearity component 450 may output a corresponding AF value to a corresponding rounding component 452. Thus, the number of rounding components 452 included in the AF component 402 may be equal to the number of non-linearity components 450 included in the AF component 402 (e.g., four, in the example of FIGS. 4A and 4B). Each rounding component 452 may output a corresponding rounded AF value. As shown by reference number 456, the AF component 402 may be configured to concatenate the rounded AF values from all of the rounding components 452, included in the AF component 402, to form a concatenated AF value. The AF component 402 may be configured to output the concatenated AF value, as an AF output, via an AF output port 458. For example, if each rounded AF value is 16 bits and there are four rounding components 452 per AF component 402, then the AF output is 64 bits, as shown.

As shown by reference number 460, an MM component 302 may be configured to concatenate the AF outputs from all of the AF components 402, included in the MM component 302, to form a concatenated AF output. For example, if each AF output is 64 bits and there are four AF components 402 per MM component 302, then the concatenated AF output is 256 bits, as shown. The MM component 302 may include an MM output port 462 configured to output the concatenated AF output as an MM output. The MM component 302 may be configured to output the MM output to the DD component 304, as described elsewhere herein.

The configuration of the components described in connection with FIGS. 4A and 4B enables the MM component 302 (and sub-components thereof) to operate in the INT16 mode and to operate in the INT8 mode using the same device architecture.

As indicated above, FIGS. 4A and 4B are provided as examples. Other examples may differ from what is described with regard to FIGS. 4A and 4B.

Figure 5:
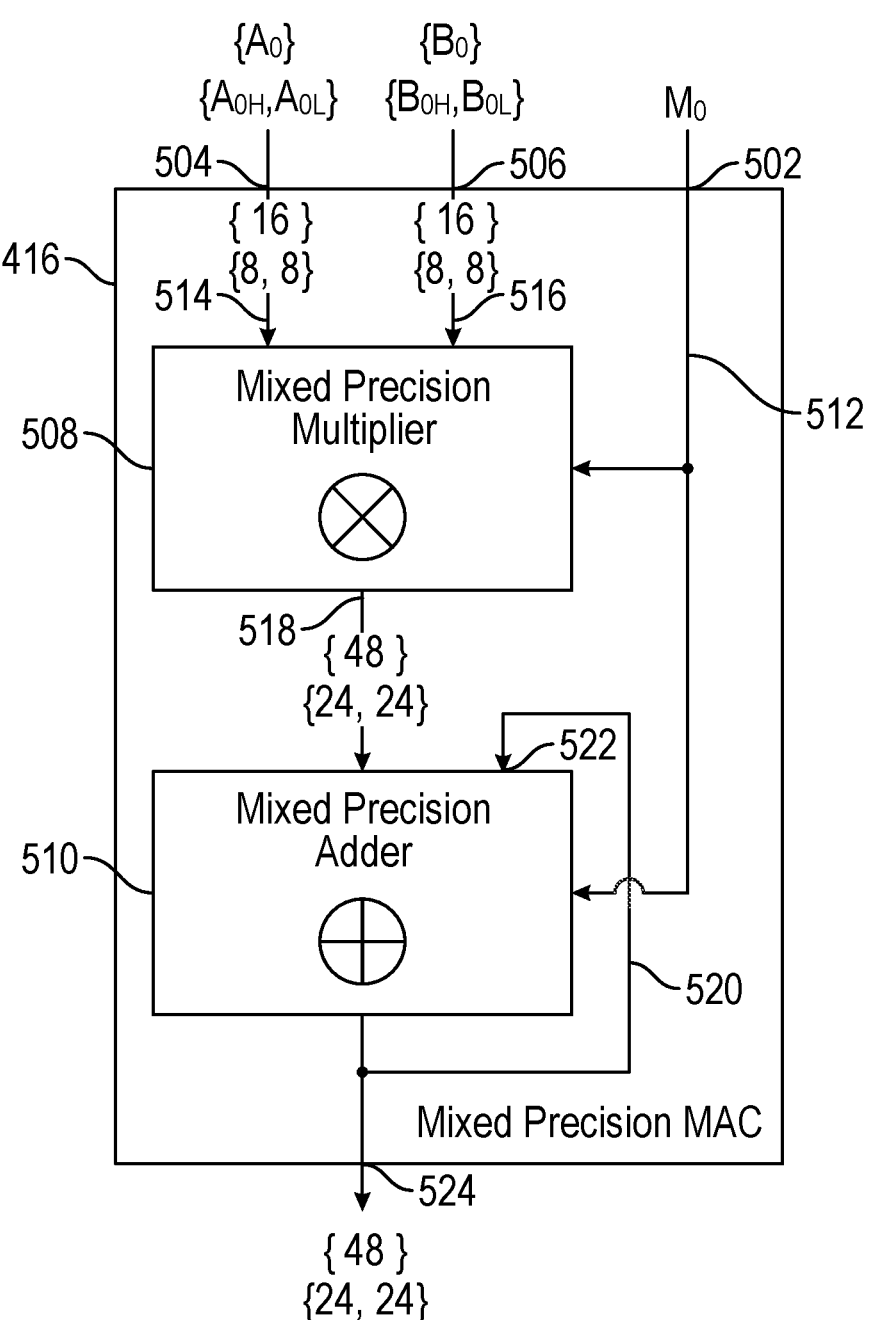
FIG. 5 is a diagram illustrating an example multiply-accumulate (MAC) component for deep learning acceleration with mixed precision.

FIG. 5 is a diagram illustrating an example MAC component 416 for deep learning acceleration with mixed precision. As described above in connection with FIGS. 4A and 4B, the MAC component 416 may be a device that is included in (e.g., that is a component of) a VV component 314, and the VV component 314 may include multiple MAC components 416. As shown in FIG. 5, the MAC component 416 may be called a mixed precision MAC. The MAC component 416 includes hardware components configured to perform operations described herein.

As shown, the MAC component 416 may include an input precision mode port 502 (sometimes called a MAC input precision mode port), a map data port 504 (sometimes called a MAC map data port) and a kernel data port 506 (sometimes called a MAC kernel data port). As further shown, the MAC component 416 may include a multiplier component 508 (sometimes called a MAC multiplier component or a mixed precision multiplier) and an adder component 510 (sometimes called a MAC adder component or a mixed precision adder). In some implementations, the map data port 504 is a 16-bit port. Additionally, or alternatively, the kernel data port 506 may be a 16-bit port.

As described elsewhere herein, the input precision mode port 502 may be configured to receive an indication of an input precision mode that indicates an input word length. The input precision mode port 502 may be connected to the input precision mode bus 408 (described above in connection with FIGS. 4A and 4B) and may be configured to provide the indication of the input precision mode to the multiplier component 508 and/or the adder component 510 via a bus 512.

The map data port 504 may be connected to a map data segment bus 418 and/or may be configured to receive a map data segment, as described above in connection with FIG. 4A. For example, the MAC component 416 may be configured to receive a map data segment, shown as $\{A_O\}$ or $\{A_{OH}, A_{OL}\}$, via the map data port 504. The map data port 504 may be configured to provide the map data segment to the multiplier component 508 via a bus 514.

The kernel data port 506 may be connected to a kernel data segment bus 420 and/or may be configured to receive a kernel data segment, as described above in connection with FIG. 4A. For example, the MAC component 416 may be configured to receive a kernel data segment, shown as $\{B_O\}$ or $\{B_{OH}, B_{OL}\}$, via the kernel data port 506. The kernel data port 506 may be configured to provide the kernel data segment to the multiplier component 508 via a bus 516.

The multiplier component 508 may be configured to operate on the map data segment and the kernel data segment based on the input precision mode. For example, in the INT16 mode, the multiplier component 508 operates on a map data segment, shown as $\{A_O\}$, as a 16-bit map word and operates on a kernel data segment, shown as $\{B_O\}$, as a 16-bit kernel word. In the INT8 mode, the multiplier component 508 treats each data segment as two 8-bit words, where the 16-bit data segment is represented by a higher (H) half of 8 bits and a lower (L) half of 8 bits. For example, in the INT8 mode, the multiplier component 508 operates on a map data segment, shown as $\{A_{OH}, A_{OL}\}$, as two 8-bit map words and operates on a kernel data segment, shown as $\{B_{OH}, B_{OL}\}$, as two 8-bit kernel words.

The multiplier component 508 may be configured to multiply the map data segment and the kernel data segment to generate a multiplier component output based on the input precision mode. The multiplier component 508 may be configured to provide the multiplier component output to the adder component 510 via a bus 518. The multiplier component output may include more bits than each of the data segments input to the multiplier component (e.g., may include three times as many bits as one of the data segments). In the example of FIG. 5, each data segment is 16 bits, and the multiplier component output is 48 bits. In the INT16 mode, the multiplier component output is a single 48-bit value. In the INT8 mode, the multiplier component output is two 24-bit values. Additional details about the operation of the multiplier component 508 are described below in connection with FIG. 6.

The adder component 510 may be configured to operate on the multiplier component output (or multiple multiplier component outputs) based on the input precision mode. For example, the adder component 510 may be configured to add multiple multiplier component outputs that are output by the multiplier component 508. For example, the multiplier component 508 may be configured to output different multiplier component outputs in different clock cycles, such as a first multiplier component output in a first clock cycle (or at a first time), a second multiplier component output in a second clock cycle (or at a second time), and so on. The adder component 510 may be configured to add these multiplier component outputs to generate an adder component output.

The adder component output may be input back into the adder component 510 via a return bus 520 and a return data port 522 (sometimes called a return port), or may be output from the MAC component 416 via a MAC output port 524. In some implementations, the MAC component 416 includes a demultiplexer (e.g., a 1-to-2 demultiplexer) or another type of control component that controls whether the adder component output is input back into the adder component 510 or is output via the MAC output port 524. For example, the MAC component 416 (or a demultiplexer of the MAC component 416) may be configured to receive a control signal, the adder component output, and a default value. If the control signal has a first value (e.g., 0), then the adder component output may be input back into the adder component 510 to be added with a multiplier component output that is output from the multiplier component 508 (and the adder component output may not be output via the MAC output port 524). If the control signal has a second value (e.g., 1), then the adder component output may be output via the MAC output port 524. Furthermore, if the control signal has the second value (e.g., 1), then a default value may be provided to the adder component 510 via the return data port 522, such as a value of zero (e.g., all zeros, such as a set of bits all having a value of zero) or a bias value (e.g., to begin accumulating the next adder component output to be output from the MAC component 416, or in the case where the adder component 510 does not sum multiple MAC outputs).

Thus, a VV component 314 and/or the adder component 510 may be configured to route the adder component output either back to the adder component 510 (e.g., as return data or a return value) or to the rounding component 430 based on a control signal. Furthermore, the VV component 314 and/or the adder component 510 may be configured to control the return value based on the control signal. Furthermore, based on the control signal, the VV component 314, the adder component 510, and/or a demultiplexer may be configured to output one of the adder component output or the default value to the return data port 522 of the adder component 510. Additionally, or alternatively, based on the control signal, the VV component 314, the adder component 510, and/or a demultiplexer may be configured to output, based on the control signal, the adder component output to one of the adder component 510 or the MAC output port 524.

In the example of FIG. 5, the adder component output is a single 48-bit value in the INT16 mode, and is two 24-bit values in the INT8 mode. Additional details about the operation of the adder component 510 are described below in connection with FIG. 7. The configuration of the components described in connection with FIG. 5 enables the MAC component 416 to operate on two 16-bit values in the INT16 mode and to operate on four 8-bit values in the INT8 mode using the same device architecture.

As indicated above, FIG. 5 is provided as an example. Other examples may differ from what is described with regard to FIG. 5.

Figure 6:
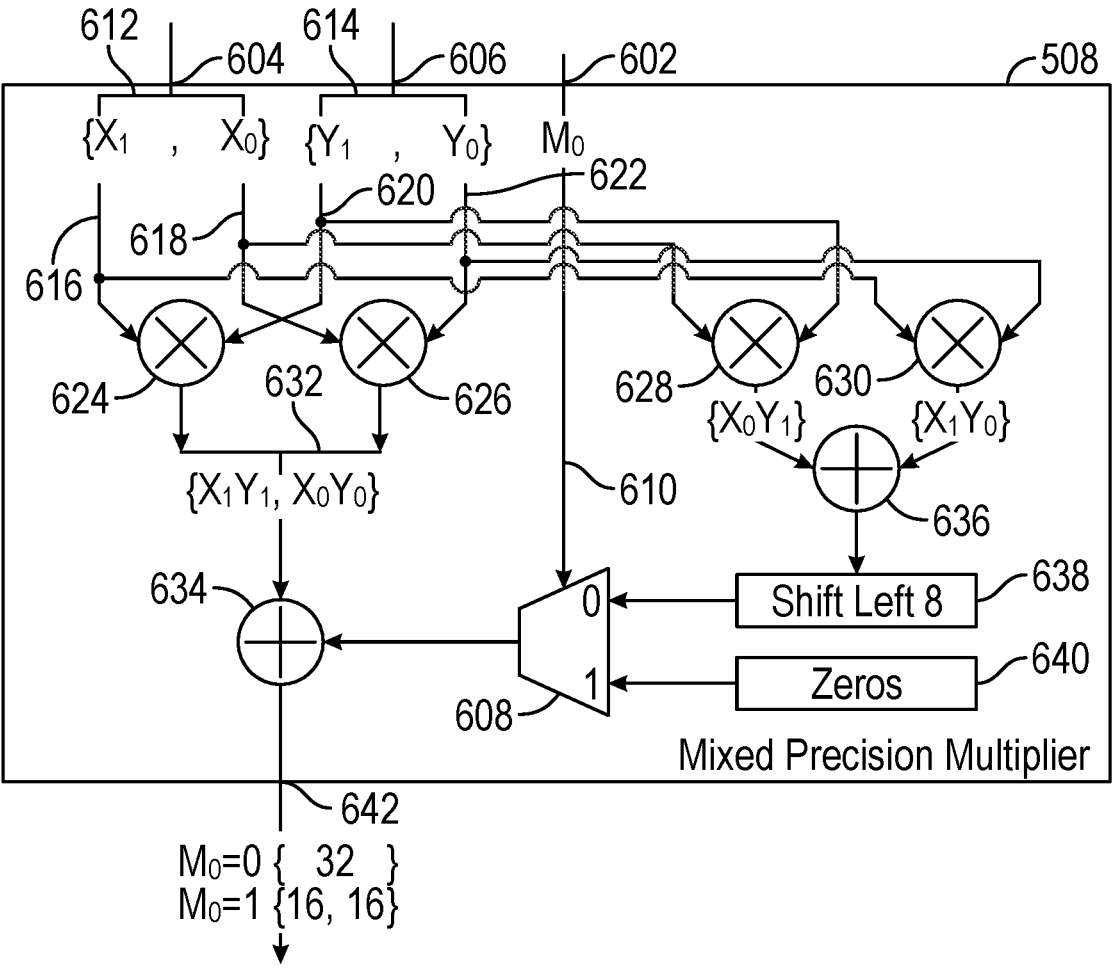
FIG. 6 is a diagram illustrating an example multiplier component for deep learning acceleration with mixed precision.

FIG. 6 is a diagram illustrating an example multiplier component 508 for deep learning acceleration with mixed precision. As described above in connection with FIG. 5, the multiplier component 508 may be a device that is included in (e.g., that is a component of) a MAC component 416. As shown in FIG. 6, the multiplier component 508 may be called a mixed precision multiplier. The multiplier component 508 includes hardware components configured to perform operations described herein.

As shown in FIG. 6, the multiplier component 508 may include an input precision mode port 602 (sometimes called a multiplier input precision mode port), a map data port 604 (sometimes called a multiplier map data port), and a kernel data port 606 (sometimes called a multiplier kernel data port). In some implementations, the input precision mode port 602 is a 1-bit port. In some implementations, the map data port 604 is a 16-bit port. In some implementations, the kernel data port 606 is a 16-bit port.

As described elsewhere herein, the input precision mode port 602 may be configured to receive an indication of an input precision mode that indicates an input word length. The input precision mode port 602 may be connected to the bus 512 (described above in connection with FIG. 5) and may provide the indication of the input precision mode to a multiplexer 608 via a bus 610.

The map data port 604 may be connected to the bus 514 and/or may be configured to receive a map data segment, as described above in connection with FIG. 5. The map data port 604 may be configured to provide the map data segment to a first splitter component 612 (sometimes called a map splitter component) configured to split the map data segment into a first half (sometimes called a map upper half, shown as $X_1$) and a second half (sometimes called a map lower half, shown as $X_0$). In some implementations, the map upper half includes the upper or leftmost bits (e.g., the most significant bits) of the map data segment, and the map lower half includes the lower or rightmost bits (e.g., the least significant bits) of the map data segment. For example, if the map data segment is 16 bits, then the map upper half may include the first 8 bits, and the map lower half may include the last 8 bits. In some implementations, splitting described herein may be performed by fetching a portion of a stored value and providing that portion to a corresponding component for further processing (and/or by successively fetching portions of the stored value and providing those portions to corresponding components)

The kernel data port 606 may be connected to the bus 516 and/or may be configured to receive a kernel data segment, as described above in connection with FIG. 5. The kernel data port 606 may be configured to provide the kernel data segment to a second splitter component 614 (sometimes called a kernel splitter component) configured to split the kernel data segment into a first half (sometimes called a kernel upper half, shown as $Y_1$) and a second half (sometimes called a kernel lower half, shown as $Y_0$). In some implementations, the kernel upper half includes the upper or leftmost bits (e.g., the most significant bits) of the kernel data segment, and the kernel lower half includes the lower or rightmost bits (e.g., the least significant bits) of the kernel data segment. For example, if the kernel data segment is 16 bits, then the kernel upper half may include the first 8 bits, and the kernel lower half may include the last 8 bits.

As further shown in FIG. 6, the first splitter component 612 may include a first output port 616 (sometimes called an upper map output port) and a second output port 618 (sometimes called a lower map output port), and the second splitter component 614 may include a first output port 620 (sometimes called an upper kernel output port) and a second output port 622 (sometimes called a lower kernel output port). The first splitter component 612 and the second splitter component 614 may each be configured to provide two outputs to a first pair of multipliers that includes a first multiplier 624 and a second multiplier 626. Furthermore, the first splitter component 612 and the second splitter component 614 may each be configured to provide two outputs to a second pair of multipliers that includes a third multiplier 628 and a fourth multiplier 630.

For example, the first splitter component 612 may be configured to provide the map upper half ($X_1$) to the first multiplier 624 via the first output port 616 and a corresponding bus. The first splitter component 612 may be configured to provide the map lower half ($X_0$) to the second multiplier 626 via the second output port 618 and a corresponding bus. The second splitter component 614 may be configured to provide the kernel upper half ($Y_1$) to the first multiplier 624 via the first output port 620 and a corresponding bus. The second splitter component 614 may be configured to provide the kernel lower half ($Y_0$) to the second multiplier 626 via the second output port 622 and a corresponding bus.

The first multiplier 624 may be configured to multiply the map upper half ($X_1$) and the kernel upper half ($Y_1$) to generate a first multiplier output (sometimes called an upper half product), represented as $X_1Y_1$. If the map upper half ($X_1$) and the kernel upper half ($Y_1$) are each 8 bits, then the first multiplier output may be 16 bits. The second multiplier $626$ may be configured to multiply the map lower half $(X_0)$ and the kernel lower half $(Y_0)$ to generate a second multiplier output (sometimes called a lower half product), represented as $X_0Y_0$. If the map lower half $(X_0)$ and the kernel lower half $(Y_0)$ are each 8 bits, then the second multiplier output may be 16 bits.

As shown by reference number $632$, the multiplier component $508$ may be configured to concatenate the first multiplier output and the second multiplier output to generate a concatenated multiplier output, represented as $\{X_1Y_1, X_0Y_0\}$. If the first multiplier output and the second multiplier output are each 16 bits, then the concatenated multiplier output may be 32 bits. The multiplier component $508$ may be configured to input the concatenated multiplier output to a first adder $634$. The first adder $634$ may be configured to add the concatenated multiplier output and an input received from the multiplexer $608$ (as described in more detail below) to generate a first adder output.

As further shown in FIG. $6$, the first splitter component $612$ may be configured to provide the map upper half $(X_1)$ to the fourth multiplier $630$ via the first output port $616$ and a corresponding bus. The first splitter component $612$ may be configured to provide the map lower half $(X_0)$ to the third multiplier $628$ via the second output port $618$ and a corresponding bus. The second splitter component $614$ may be configured to provide the kernel upper half $(Y_1)$ to the third multiplier $628$ via the first output port $620$ and a corresponding bus. The second splitter component $614$ may be configured to provide the kernel lower half $(Y_0)$ to the fourth multiplier $630$ via the second output port $622$ and a corresponding bus.

The third multiplier $628$ may be configured to multiply the map lower half $(X_0)$ and the kernel upper half $(Y_1)$ to generate a third multiplier output (sometimes called a map-lower kernel-upper product), represented as $X_0Y_1$. If the map lower half $(X_0)$ and the kernel upper half $(Y_1)$ are each 8 bits, then the third multiplier output may be 16 bits. The fourth multiplier $630$ may be configured to multiply the map upper half $(X_1)$ and the kernel lower half $(Y_0)$ to generate a fourth multiplier output (sometimes called a map-upper kernel-lower product), represented as $X_1Y_0$. If the map upper half $(X_1)$ and the kernel lower half $(Y_0)$ are each 8 bits, then the fourth multiplier output may be 16 bits. The third multiplier $628$ may provide the third multiplier output to a second adder $636$. Similarly, the fourth multiplier $630$ may provide the fourth multiplier output to the second adder $636$.

The second adder $636$ may be configured to add the third multiplier output $(X_0Y_1)$ and the fourth multiplier output $(X_1Y_0)$ to generate a second adder output (e.g., $X_0Y_1 + X_1Y_0$). If the third multiplier output and the fourth multiplier output are each 16 bits, then the second adder output may be 16 bits. The second adder $636$ may be configured to provide the second adder output to a left shift component $638$ (shown as "Shift Left 8"). The left shift component $638$ may be configured to shift the second adder output a number of bits to the left (e.g., 8 bits to the left), such as by concatenating the second adder output with a number of zeros (equal to the number of bits, such as 8) to generate a left-shifted output. For example, the left shift component $638$ may be configured to concatenate the second adder output with a set of least significant zero bits to generate the left-shifted output. The left-shifted output may include a set of most significant bits, which are the bits of the second adder output, and a set of least significant bits that are all zero (e.g., a set of least significant zero bits). In the example of FIG. $6$, where the map data segment and the kernel data segment are each 16 bits, the left shift component $638$ shifts the second adder output 8 bits to the left (e.g., half the length of the input data segments), such as by adding 8 zeros on the right of the second adder output. The left shift component $638$ may be configured to provide the left-shifted output to the multiplexer $608$.

As further shown in FIG. $6$, the multiplier component $508$ may include a zeros component $640$. The zeros component $640$ may be configured to generate a zero output, such as a number of zeros (e.g., a set of zeros, such as eight zeros, sixteen zeros, thirty-two zeros, or another number of zeros). The zeros component $640$ may be configured to provide the zero output to the multiplexer $608$.

The multiplexer $608$ may be configured to receive the left-shifted output from the left shift component $638$, may be configured to receive the zero output from the zeros component $640$, and may be configured to provide one of the left-shifted output or the zero output to the first adder $634$ based on the input precision mode. In other words, the multiplexer $608$ may be configured to select and/or output, based on the input precision mode, a value to be used to generate the multiplier component output. For example, the multiplexer $608$ may be configured to select and/or output one of a first value (e.g., the left-shifted output) or a second value (e.g., the zero output) based on the input precision mode. For example, if the input precision mode indicates a first input precision mode (e.g., an INT16 mode when $M_0=0$), then the multiplexer $608$ provides the left-shifted output to the first adder $634$. If the input precision mode indicates a second input precision mode (e.g., an INT8 mode when $M_0=1$), then the multiplexer $608$ provides the zero output to the first adder $634$.

The first adder $634$ may be configured to add the concatenated multiplier output and an input received from the multiplexer $608$ to generate a first adder output. For example, the first adder $634$ may be configured to add the concatenated multiplier output and either a first value (e.g., the left-shifted output) or a second value (e.g., the zero output). In the first precision mode (e.g., the INT16 mode, when $M_0=0$), the first adder $634$ may add the concatenated multiplier output and the left-shifted output. In the second precision mode (e.g., the INT8 mode, when $M_0=1$), the first adder $634$ may add the concatenated multiplier output and the zero output.

As shown, the first adder output may be 32 bits. For example, in the INT16 mode, the first adder output represents a single 32-bit value. In the INT8 mode, the first adder output represents two 16-bit values. In some implementations, the MAC component $416$ and/or the multiplier component $508$ includes an extension component configured to extend the first adder output to generate a signed extension output. For example, the extension component may be configured to perform a signed extension operation to generate a 48-bit output that is a signed extension of the first adder output.

In some implementations, such as when the multiplier component $508$ includes the extension component, the signed extension output may be output from the multiplier component $508$ via a multiplier component output port $642$. In these implementations, the signed extension output is sometimes called a multiplier component output. Alternatively, when the multiplier component $508$ does not include the extension component, then the first adder output may be output from the multiplier component $508$ via a multiplier component output port $642$. In these implementations, the first adder output is sometimes called a multiplier component output, and may be operated on by the extension component external from the multiplier component 508. For example, the multiplier component output may be input into the extension component, which may be configured to provide the signed extension output to the adder component 510 (as shown in FIG. 5).

The configuration of the components described in connection with FIG. 6 enables the multiplier component 508 to operate on two 16-bit values in the INT16 mode and to operate on four 8-bit values in the INT8 mode using the same device architecture.

As indicated above, FIG. 6 is provided as an example. Other examples may differ from what is described with regard to FIG. 6.

Figure 7:
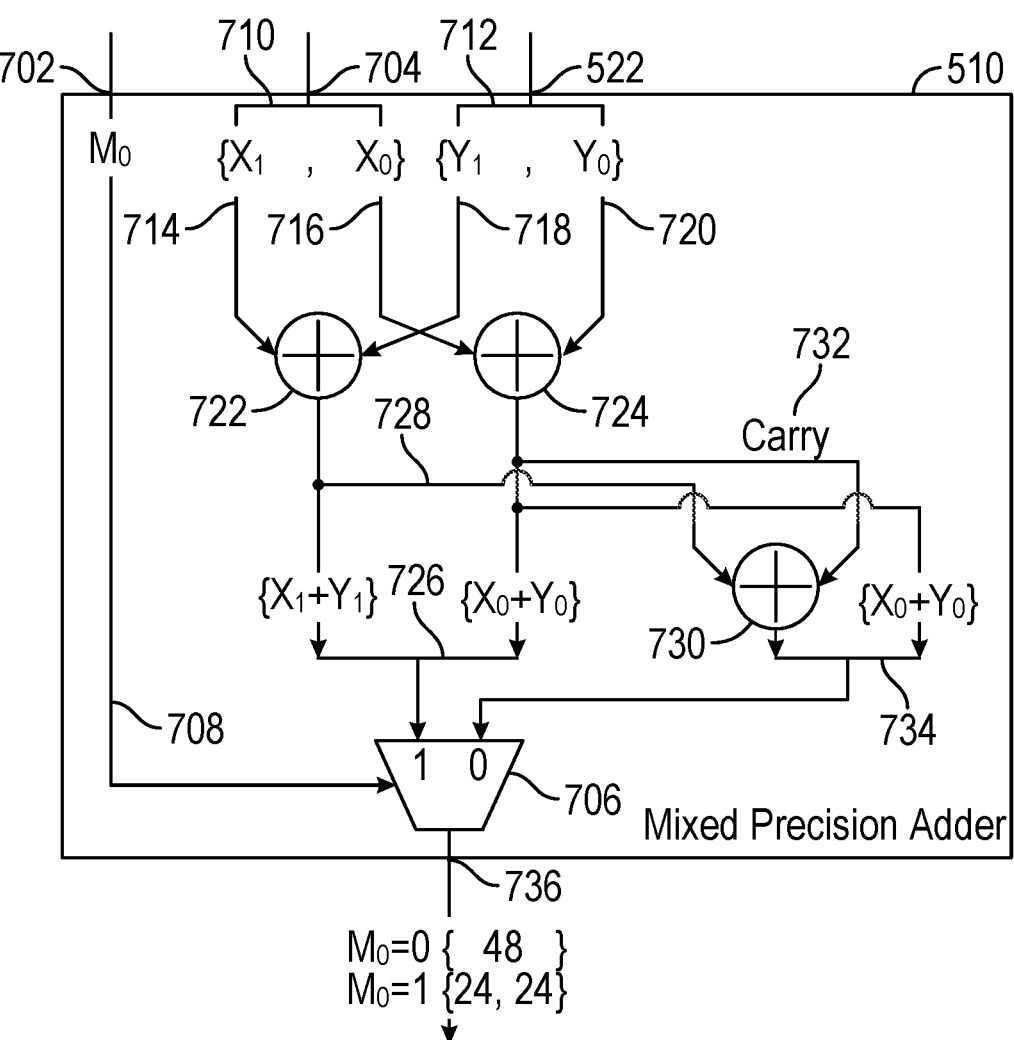
FIG. 7 is a diagram illustrating an example adder component for deep learning acceleration with mixed precision.

FIG. 7 is a diagram illustrating an example adder component 510 for deep learning acceleration with mixed precision. As described above in connection with FIG. 5, the adder component 510 may be a device that is included in (e.g., that is a component of) a MAC component 416. As shown in FIG. 7, the adder component 510 may be called a mixed precision adder. The adder component 510 includes hardware components configured to perform operations described herein.

As shown in FIG. 7, the adder component 510 may include an input precision mode port 702 (sometimes called an adder input precision mode port), a new data port 704, and a return data port 522. As described elsewhere herein, the input precision mode port 702 may be configured to receive an indication of an input precision mode that indicates an input word length. The input precision mode port 702 may be connected to the bus 512 (described above in connection with FIG. 5) and may provide the indication of the input precision mode to a multiplexer 706 via a bus 708. In some implementations, the input precision mode port 702 is a 1-bit port. In some implementations, the new data port 704 is a 48-bit port. In some implementations, the return data port 522 is a 48-bit port.

The new data port 704 may receive data that has not yet been operated on by the adder component 510, which is sometimes called new data. For example, the new data port 704 may be connected to the bus 518 and/or may be configured to receive the new data. The new data may be a multiplier component output that is received from the multiplier component 508 or a signed extension output generated based on the multiplier component output, as described above.

The new data port 704 may be configured to provide the new data to a first splitter component 710 (sometimes called a new data splitter component). The first splitter component 710 may be configured to split the new data into a first half (sometimes called a new data upper half, shown as $X_1$) and a second half (sometimes called a new data lower half, shown as $X_0$). In some implementations, the new data upper half includes the upper or leftmost bits (e.g., the most significant bits) of the new data, and the new data lower half includes the lower or rightmost bits (e.g., the least significant bits) of the new data. For example, if the new data is 16 bits, then the new data upper half may include the first 8 bits, and the new data lower half may include the last 8 bits.

The return data port 522 may be connected to the return bus 520 and/or may be configured to receive return data (sometimes called a return value). As described above in connection with FIG. 5, the return data may be an adder component output that is output by the adder component 510 during a prior clock cycle. The return data port 522 may be configured to provide the return data to a second splitter component 712 (sometimes called a return data splitter component). The second splitter component 712 may be configured to split the return data into a first half (sometimes called a return data upper half, shown as $Y_1$) and a second half (sometimes called a return data lower half, shown as $Y_0$). In some implementations, the return data upper half includes the upper or leftmost bits (e.g., the most significant bits) of the return data, and the return data lower half includes the lower or rightmost bits (e.g., the least significant bits) of the return data. For example, if the return data is 16 bits, then the return data upper half may include the first 8 bits, and the return data lower half may include the last 8 bits.

As further shown in FIG. 7, the first splitter component 710 includes a first output port 714 (sometimes called an upper new data output port) and a second output port 716 (sometimes called a lower new data output port), and the second splitter component 712 includes a first output port 718 (sometimes called an upper return data output port) and a second output port 720 (sometimes called a lower return data output port). The first splitter component 710 and the second splitter component 712 may each be configured to provide an output to a first adder 722 and a second adder 724.

For example, the first splitter component 710 may be configured to provide the new data upper half $(X_1)$ to the first adder 722 via the first output port 714 and a corresponding bus. The first splitter component 710 may be configured to provide the new data lower half $(X_0)$ to the second adder 724 via the second output port 716 and a corresponding bus. The second splitter component 712 may be configured to provide the return data upper half $(Y_1)$ to the first adder 722 via the first output port 718 and a corresponding bus. The second splitter component 712 may be configured to provide the return data lower half $(Y_0)$ to the second adder 724 via the second output port 720 and a corresponding bus.

The first adder 722 may be configured to add the new data upper half $(X_1)$ and the return data upper half $(Y_1)$ to generate a first adder output (sometimes called an upper half sum), represented as $X_1+Y_1$. The second adder 724 may be configured to add the new data lower half $(X_0)$ and the return data lower half $(Y_0)$ to generate a second adder output (sometimes called a lower half sum), represented as $X_0+Y_0$. In some implementations, the first adder 722 is a 24-bit adder. In some implementations, the second adder 724 is a 24-bit adder.

As shown by reference number 726, the adder component 510 may be configured to concatenate the first adder output and the second adder output to generate a first concatenated sum, which may be represented as $\{X_1+Y_1, X_0+Y_0\}$. The adder component 510 may be configured to input the first concatenated sum to the multiplexer 706.

As shown by reference number 728, the adder component 510 (and/or the first adder 722) may be configured to provide the first adder output $(X_1+Y_1)$ to a third adder 730 (e.g., via a bus). Furthermore, the second adder 724 may be configured to generate a carry output that represents a value of a carry bit (sometimes called a carry bit value) resulting from adding the new data lower half and the return data lower half. The carry bit value may have a value of, for example, zero or one. If adding the new data lower half and the return data lower half results in a bit to be carried over to the next most significant bit (e.g., one bit left of the leftmost bits of $X_0$ and $Y_0$), then the carry output may be equal to 1. Otherwise, the carry output may be equal to zero. As shown by reference number 732, the adder component 510 (and/or the second adder 724) may be configured to provide the carry output to the third adder 730 (e.g., via a bus).

The third adder 730 may be configured to add the first adder output $(X_1+Y_1)$ and the carry output (0 or 1) to generate a third adder output $(X_1+Y_1+Carry)$. As shown by reference number 734, the adder component 510 may be configured to concatenate the third adder output and the second adder output $(X_0+Y_0)$ to generate a second concatenated sum, which may be represented as $\{X_1+Y_1+Carry, X_0+Y_0\}$. The adder component 510 may be configured to input the second concatenated sum to the multiplexer 706.

The multiplexer 706 may be configured to receive the first concatenated sum and the second concatenated sum, and may be configured to output one of the first concatenated sum or the second concatenated sum based on the input precision mode. In other words, the multiplexer 706 may be configured to select, based on the input precision mode, either the first concatenated sum or the second concatenated sum as the adder component output of the adder component 510. For example, if the input precision mode indicates a first input precision mode (e.g., an INT16 mode when $M_0=0$), then the multiplexer 706 outputs the second concatenated sum $\{X_1+Y_1+Carry, X_0+Y_0\}$ as a multiplexer output. If the input precision mode indicates a second input precision mode (e.g., an INT8 mode when $M_0=1$), then the multiplexer 706 outputs the first concatenated sum $\{X_1+Y_1, X_0+Y_0\}$ as the multiplexer output.

As shown in FIG. 7, the multiplexer output may be output from the adder component 510, as the adder component output, via an adder component output port 736. In some implementations, the adder component output is 48 bits. In the INT16 mode, the adder component output may represent a single 48-bit value. In the INT8 mode, the adder component output may represent two 24-bit values.

The configuration of the components described in connection with FIG. 7 enables the adder component 510 to operate on two 48-bit values in the INT16 mode and to operate on four 24-bit values in the INT8 mode using the same device architecture.

As indicated above, FIG. 7 is provided as an example. Other examples may differ from what is described with regard to FIG. 7.

Figure 8:
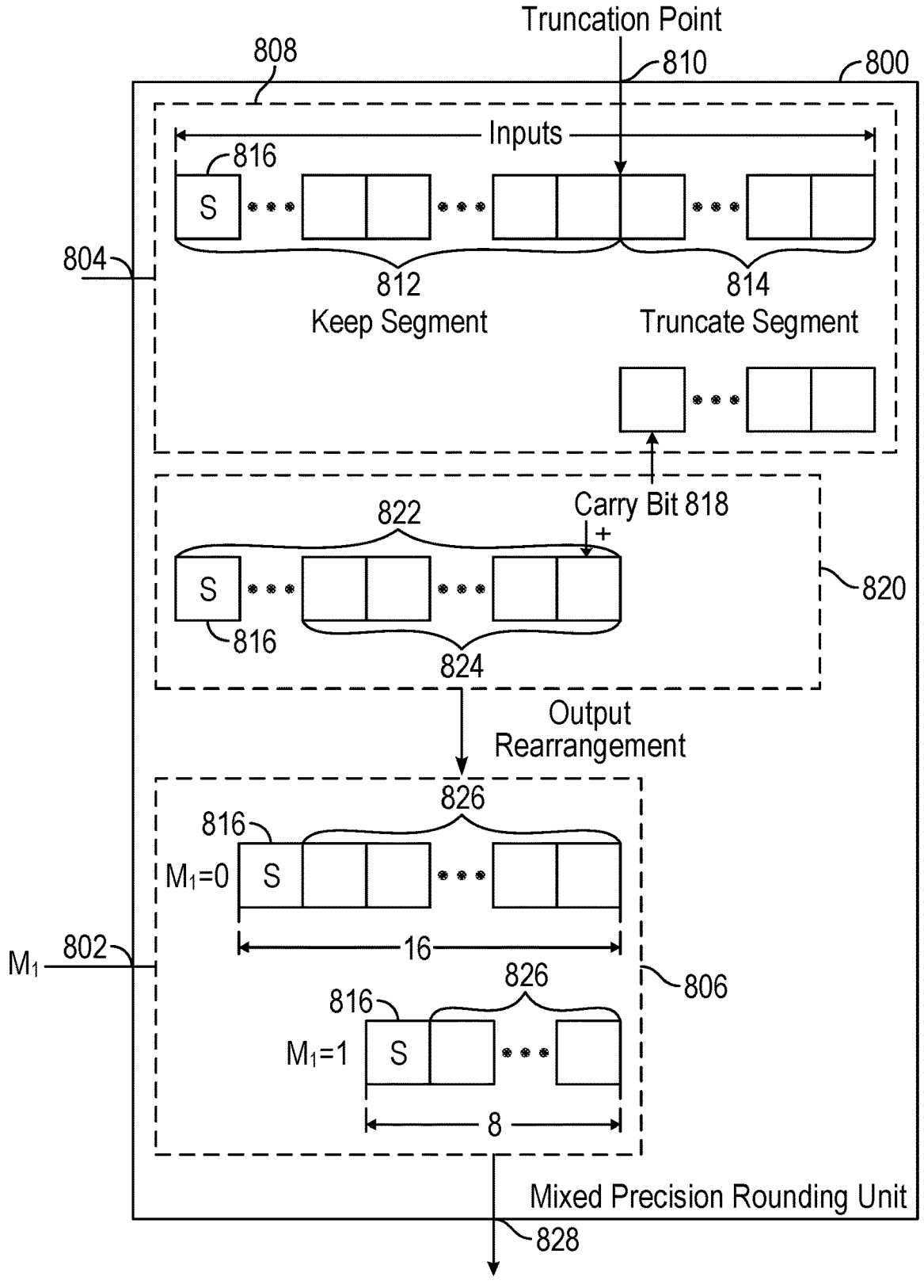
FIG. 8 is a diagram illustrating an example rounding component for deep learning acceleration with mixed precision.

FIG. 8 is a diagram illustrating an example rounding component 800 for deep learning acceleration with mixed precision. In some implementations, the rounding component 800 corresponds to the rounding component 430 described elsewhere herein. Additionally, or alternatively, the rounding component 800 may correspond to the rounding component 452 described elsewhere herein. Thus, the rounding component 800 may be a device that is included in (e.g., that is a component of) a VV component 314 and/or an AF component 402. As shown in FIG. 8, the rounding component 800 may be called a mixed precision rounding unit. The rounding component 800 includes hardware components configured to perform operations described herein.

As shown in FIG. 8, the rounding component 800 may include an output precision mode port 802 (sometimes called a rounding component output precision mode port) and a data input port 804 (sometimes called a rounding component data input port). As described elsewhere herein, the output precision mode port 802 may be configured to receive an indication of an output precision mode that indicates an output word length. The output precision mode port 802 may be connected to the bus 410 (described in connection with FIGS. 4A and 4B) and may provide the indication of the output precision mode to a rounded output generation component 806 of the rounding component 800.

In some implementations, the output precision mode port 802 is a 1-bit port. In some implementations, the data input port 804 is a 48-bit port (e.g., for the rounding component 430). In some implementations, the data input port 804 is a 32-bit port (e.g., for the rounding component 452).

The data input port 804 may be configured to receive an input value to be rounded (e.g., to a nearest value). In some implementations, the data input port 804 may be connected to the bus 432 and/or may be configured to receive the input value from the adder component 426 (e.g., for the rounding component 430). In some implementations, the data input port 804 may be connected to the bus 454 and/or may be configured to receive the input value from a non-linearity component 450 (e.g., for the rounding component 452). The data input port 804 may be configured to provide the input value to a truncation component 808.

As further shown in FIG. 8, the rounding component 800 may include a truncation point input port 810 configured to receive an indication of a truncation point. The truncation point may indicate a number of bits to be included in a keep segment value 812 and/or a number of bits to be included in a truncate segment value 814. In other words, the truncation point may indicate a number of bits to be truncated (e.g., dropped or removed) from the input value. In some implementations, the rounding component 800 may be configured to receive the indication of the truncation point from the system 320. The truncation point input port 810 may be configured to provide the indication of the truncation point to the truncation component 808.

The truncation component 808 may be configured to truncate the input value into a keep segment value 812 and a truncate segment value 814. For example, the truncation component 808 may be configured to truncate the input value into the keep segment value 812 and the truncate segment value 814 based on the truncation point. As shown, the keep segment value 812 may include a set of most significant bits (e.g., leftmost bits or upper bits), which may include a sign bit 816 (shown as 5). The sign bit may indicate a sign of the input value (and thus, the keep segment value 812), such as positive or negative. As further shown, the truncate segment value 814 may include a set of least significant bits (e.g., rightmost bits or lower bits), which may include a carry bit 818. The carry bit 818 is the most significant bit (e.g., leftmost bit) of the bits included in the truncate segment value 814. The number of bits included in the set of most significant bits (e.g., the keep segment bits) and/or the number of bits included in the set of least significant bits (e.g., the truncate segment bits) may be indicated by the truncation point, as described above.

As further shown in FIG. 8, the rounding component 800 may include an adder component 820. The adder component 820 may be configured to add the carry bit 818 to the keep segment value 812 to generate a rounded keep segment value 822. The rounded keep segment value 822 may include the sign bit 816 and a set of non-sign bits 824 (e.g., the remaining bits other than the sign bit 816). The adder component 820 may be configured to provide the rounded keep segment value 822 (or only the non-sign bits 824 of the rounded keep segment value 822) to the rounded output generation component 806.

The rounded output generation component 806 may be configured to generate a rounded output based on the rounded keep segment value 822 (or the non-sign bits 824) and the output precision mode. For example, the rounded output generation component 806 may be configured to generate the rounded output by concatenating the sign bit with a set of value bits 826. The set of value bits 826 may include a number of least significant bits (e.g., rightmost bits or lower bits) included in the set of non-sign bits 824 (and thus included in the rounded keep segment value 822). In some implementations, the number of value bits 826 is less than the number of non-sign bits 824. In some implementations, the number of value bits 826 may be equal to the number of non-sign bits 824.

The number of bits included in the set of value bits 826 may be based on the output precision mode. For example, if the indication of the output precision mode is a first value (e.g., $M_1=0$), indicating a first output precision mode (e.g., an INT16 mode), then the set of value bits 826 may include a first number of bits. If the indication of the output precision mode is a second value (e.g., $M_1=1$), indicating a second output precision mode (e.g., an INT8 mode), then the set of value bits 826 may include a second number of bits that is different than the first number of bits. In the example of FIG. 8, the rounded output generation component 806 is configured to include 15 value bits when the indication of the output precision mode is a first value (e.g., indicating the INT16 mode), for a total of 16 bits in the rounded output (e.g., 1 sign bit and 15 value bits). Continuing with the example of FIG. 8, the rounded output generation component 806 is configured to include 7 value bits when the indication of the output precision mode is a second value (e.g., indicating the INT8 mode), for a total of 8 bits in the rounded output (e.g., 1 sign bit and 7 value bits).

As further shown in FIG. 8, the rounding component 800 may include an output port 828 (sometimes called a rounding component output port). The output port 828 may be configured to output the rounded output from the rounding component 800 as a rounding component output. In some implementations, the output port 828 is a 16-bit port, and the rounding component output is 16 bits. In the INT16 mode, the 16 bits of the rounding component output represent a single 16-bit word. In the INT8 mode, the rounding component 800 may be configured to generate a signed extension of the 8-bit rounded output (e.g., using an extension component), and may be configured to output the signed extension of the rounded output as a 16-bit rounding component output {SX, 8}, such as for the rounding component 430. Alternatively, in the INT8 mode, the rounding component 800 may be configured to concatenate padding bits with the 8-bit rounded output (e.g., using a padding component), and may be configured to output the padded rounded output as a 16-bit rounding component output {P, 8}, such as for the rounding component 452. In this case, a first set of 8 bits (e.g., the most significant 8 bits) is padding and a second set of 8 bits (e.g., the least significant 8 bits) is the 8-bit rounded output. Thus, the rounding component 800 may be configured to output a rounding component output that includes a particular quantity of bits (e.g., 16 bits in the example of FIG. 8) regardless of the output precision mode.

In some implementations, the rounding component output is output from the VV component 314 via a VV output port 434 (e.g., for the rounding component 430), as described above in connection with FIG. 4A. Alternatively, the rounding component output may be concatenated with other rounding component outputs, and the concatenated rounding component output may be output from the AF component 402 via an AF output port 458 (e.g., for the rounding component 452), as described above in connection with FIG. 4B. The output from the rounding component 430 is sometimes called a first rounded output (or a first rounded output value), and the output from the rounding component 452 is sometimes called a second rounded output (or a second rounded output value).

The configuration of the components described in connection with FIG. 8 enables the rounding component 800 to provide mixed precision output (e.g., INT16 output or INT8 output) based on an indication of an output precision mode.

As indicated above, FIG. 8 is provided as an example. Other examples may differ from what is described with regard to FIG. 8.

Figure 9:
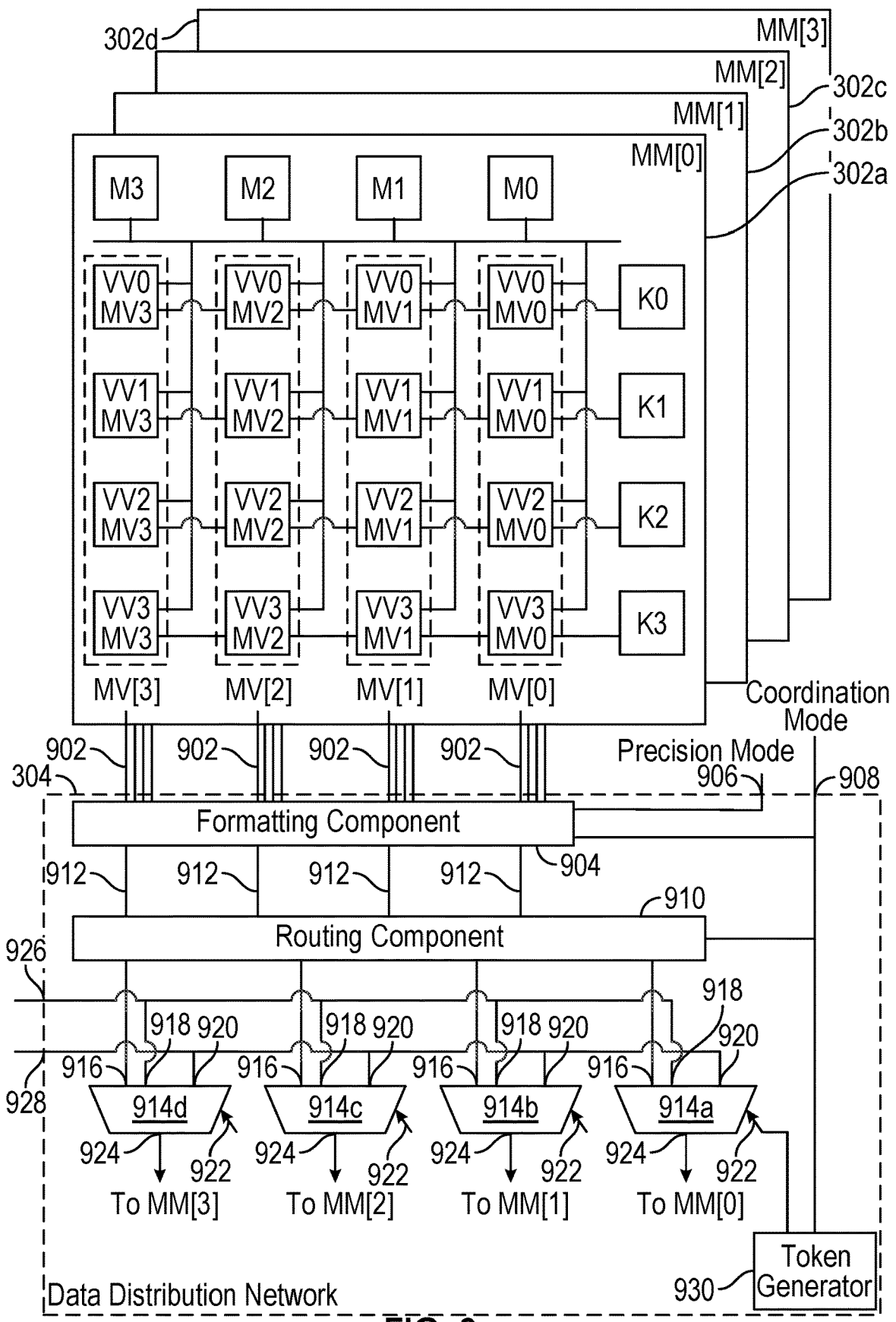
FIG. 9 is a diagram illustrating an example data distribution component for deep learning acceleration with mixed precision.

FIG. 9 is a diagram illustrating an example DD component 304 for deep learning acceleration with mixed precision. As described above in connection with FIG. 3, the DD component 304 may be a device that is included in (e.g., that is a component of) a device 300. As shown in FIG. 9, the DD component 304 may be called a data distribution network. The DD component 304 includes hardware components configured to perform operations described herein.

As described above in connection with FIG. 3, the DD component 304 may be connected to multiple MM components 302, shown as a first MM component 302a or MM[0], a second MM component 302b or MM[1], a third MM component 302c or MM[2], and a fourth MM component 302d or MM[3]. For example, the DD component 304 may include multiple DD component input ports 902 configured to receive data from the MM components 302. In some implementations, the number of DD component input ports 902 included in the DD component 304 may be equal to the number of MM components 302 included in the device 300. In these implementations, each DD component input port 902 may be connected to a different MM component 302. For example, each DD component input port 902 may be connected to a different MM output port 462 via a corresponding bus. As an example, if the device 300 includes four MM components 302, then the DD component 304 may include four DD component input ports 902.

Alternatively, as shown in FIG. 9, the number of DD component input ports 902 included in the DD component 304 may be equal to the number of MV components 312 included in the device 300 and/or may be equal to the number of AF components 402 included in the device 300. In this implementation, each DD component input port 902 is connected to a different AF component 402. For example, each DD component input port 902 may be connected to a different AF output port 458 via a corresponding bus. As an example, if the device 300 includes four MM components 302 and includes four MV components 312 (and four AF components 402) per MM component 302, then the DD component 304 may include sixteen DD component input ports 902. In this example, each MM component 302 may connect to a different set of four DD component input ports 902.

As further shown in FIG. 9, the DD component 304 may include a formatting component 904. The formatting component 904 may be configured to format DD input data received via the DD component input ports 902 to generate formatted DD data. In some implementations, the formatting component 904 may be configured to generate the formatted DD data from the DD input data based on an output precision mode (e.g., $M_1$). The output precision mode may indicate a word length for data output from the MM components 302, the MV components 312, and/or the AF components 402 and received by the DD component 304. Additionally, or alternatively, the formatting component 904 may be configured to generate the formatted DD data from the DD input data based on a coordination mode. Thus, the formatting component 904 may include a precision mode port (sometimes called a formatting component precision mode port) configured to receive the indication of the output precision mode and/or may include a coordination mode port (sometimes called a formatting component coordination mode port) configured to receive the indication of the coordination mode. Additional details regarding operation of the formatting component 904 are described below in connection with FIGS. 10 and 11.

As further shown in FIG. 9, the DD component 304 may include a precision mode port 906, sometimes called a DD component precision mode port or a DD component output precision mode port. The precision mode port 906 may be configured to receive an indication of the output precision mode (e.g., $M_1$). The precision mode port 906 may be configured to provide the indication of the output precision mode to the formatting component 904 via a bus. In some implementations, the precision mode port 906 is a 1-bit port. Similarly, the DD component 304 may include a coordination mode port 908, sometimes called a DD component coordination mode port. The coordination mode port 908 may be configured to receive an indication of the coordination mode, as described in more detail elsewhere herein. The coordination mode port 908 may be configured to provide the indication of the coordination mode to the formatting component 904 via a bus (sometimes called a coordination mode bus). In some implementations, the coordination mode port 908 is a 1-bit port (e.g., to receive a 1-bit value indicating one of a cooperative mode or an independent mode).

As further shown in FIG. 9, the DD component 304 may include a routing component 910. The routing component 910 may be configured to receive the formatted DD data from the formatting component 904 via one or more buses 912 (shown as four buses 912). In some implementations, the formatting component 904 is configured to provide the formatted DD data to the routing component 910 via a single bus 912. In these implementations, the routing component 910 may be configured to separate the formatted DD data into multiple formatted DD data segments. In some implementations, each formatted DD data segment corresponds to data received from a different MM component 302. For example, if the device 300 includes four MM components 302, then the routing component 910 may be configured to separate the formatted DD data into four formatted DD data segments (e.g., with each segment being based on MM output from a different one of the four MM components 302).

Alternatively, the formatting component 904 may be configured to provide the formatted DD data to the routing component 910 via multiple buses 912. In these implementations, the routing component 910 may be configured to receive a different formatted DD data segment (as described above) via each bus 912. For example, the DD component 304 may include a number of buses 912 equal to the number of MM components 302 included in the device 300, and a formatted DD data segment that is based on MM output from a particular MM component 302 may be provided via a particular bus 912.

The routing component 910 may be configured to route the formatted DD data to multiple multiplexers 914, shown as a first multiplexer 914a, a second multiplexer 914b, a third multiplexer 914c, and a fourth multiplexer 914d. In some implementations, the number of multiplexers 914 included in the DD component 304 is equal to the number of MM components 302 included in the device 300. In some implementations, the routing component 910 is configured to route the formatted DD data based on the coordination mode. Thus, the routing component 910 may include a coordination mode port (sometimes called a routing component coordination mode port) configured to receive the indication of the coordination mode (e.g., via the coordination mode port 908 and a corresponding bus, such as the coordination mode bus). In some implementations, the routing component 910 includes one or more switches (sometimes called routing switches) or similar components capable of being configured to route data to the multiplexers 914 in a first manner in the cooperative mode and configured to route data to the multiplexers 914 in a second (different) manner in the independent mode. Additional details regarding operation of the routing component 910 based on the coordination mode are described below in connection with FIGS. 10 and 11.

As shown in FIG. 9, each multiplexer 914 may include one or more MM data input ports 916 (represented in FIG. 9 as a single port, but which may include multiple ports), a max pool port 918 (sometimes called a multiplexer max pool port), a load port 920 (sometimes called a multiplexer load port), a token port 922, and a multiplexer output port 924. The MM data input ports 916 may be configured to receive MM data based on output generated by an MM component 302. For example, the MM data may be the formatted DD data or a formatted DD data segment. As shown, the MM data input ports 916 may be connected to the routing component 910 (e.g., via corresponding buses).

A max pool port 918 may be configured to receive max pool data generated based on a max pooling operation. In a CNN, a max pooling operation may generate a smaller map (e.g., a 2 by 2 map) from a larger map (e.g., a 4 by 4 map) by selecting the maximum value out of multiple elements of the larger map (e.g., a 2 by 2 portion of the larger map) and outputting that maximum value into a single element of the smaller map. The max pool data generated by the max pooling operation may be the smaller map. As shown, the DD component 304 may include a global max pool port 926 (sometimes called a DD component max pool port) configured to receive the max pool data (e.g., from the system 320, the memory 322, and/or a max pool component of the device 300). The global max pool port 926 may be configured to provide the max pool data to each multiplexer 914 (e.g., via each max pool port 918 and one or more corresponding buses).

A load port 920 may be configured to receive map data (sometimes called external map data) from the system 320. For example, a load port 920 may receive map data from the memory 322 external from the device 300, rather than receiving map data (sometimes called internal map data) from the MM components 302 internal to the device 300. As shown, the DD component 304 may include a global load port 928 (sometimes called a DD component load port) configured to receive the external map data (e.g., from the system 320 and/or memory 322). The global load port 928 may be configured to provide the external map data to each multiplexer 914 (e.g., via each load port 920 and one or more corresponding buses).

In some implementations, the DD component input ports 902, the global max pool port 926, and the global load port 928 may be referred to collectively as data input ports or DD data input ports. Thus, the DD component 304 may include multiple DD data input ports configured to receive data from one or more components of the device 300 (e.g., the MM components 302, which output MM data) and/or from the system 320 (e.g., which may output the max pool data and/or the load data). The DD component 304 may be configured to receive DD input values, such as the MM data, the max pool data, and/or the load data, via the DD data input ports. The DD component 304 may be configured to load a subset of DD input values (e.g., only the load data, only the max pool data, or only the MM data) into map memory components 308 of the MM components 302 (e.g., as the map data) for a particular output and/or clock cycle of the DD component 304, as described in more detail below.

A token port 922 may be configured to receive a token value. The token value may dictate which input(s) to a multiplexer 914 are provided as output from the multiplexer output port 924 of that multiplexer 914. In other words, the token value may be or may include an indication of whether to select the map data, the max pool data, or an MM value (out of multiple MM values) as an output from a multiplexer 914. As shown in FIG. 9, the DD component 304 may include a token generator 930 configured to generate a token value. The token generator 930 may be configured to generate a token value for each instance of a token cycle (e.g., a token cycle that cycles through multiple instances). For example, the token generator 930 may be configured to generate a first token value for a first instance of a token cycle, may be configured to generate a second (different) token value for a second instance of the token cycle, and so on. After the token generator 930 generates a token value for a last instance (or final instance) of the token cycle, the token generator 930 may then generate the first token value for the next instance after the last instance. As shown, the token generator 930 may be configured to provide the token value to each multiplexer 914 (e.g., via each token port 922 and one or more corresponding buses). In some implementations, the token generator 930 may be configured to provide the same token value to each multiplexer 914 at a particular instance of the token cycle. Although FIG. 9 shows a bus between the token generator 930 and only the token port 922 of the first multiplexer 914a, the token generator 930 may be connected to the token ports 922 of all of the multiplexers 914 via one or more buses.

As shown in FIG. 9, in some implementations, the token generator 930 may include a coordination mode port (sometimes called a token generator coordination mode port) configured to receive the indication of the coordination mode (e.g., via the coordination mode port 908 and a corresponding bus, such as the coordination mode bus). In these implementations, the token generator 930 may be configured to generate a token value (e.g., a value of 0, 1, 2, 3, 4, 5, 6, 7, 8, or 9, depending on an instance of the token cycle) and identify a multiplexer input (e.g., MM data from an MM data input port 916, max pool data from a max pool port 918, or external map data from a load port 920) to be selected as an output from a multiplexer 914. The token generator 930 may be configured to identify the multiplexer input based on the token value, such as by using a data structure stored by the token generator 930, such as a lookup table, that stores information that identifies a set of token values and corresponding multiplexer inputs. In some implementations, the token generator 930 may be configured to identify the multiplexer input based on the coordination mode. For example, the token generator 930 may store multiple data structures (e.g., one for the cooperative mode and one for the independent mode) and may select a data structure, to be used to identify the multiplexer input, based on the coordination mode.

In some implementations (e.g., when the token generator includes the coordination mode port and is configured to identify a multiplexer input based on the token value and the coordination mode), the token generator 930 may be configured to provide an indication of the identified multiplexer input to the multiplexers 914 (e.g., using a port identifier that identifies an input port of a multiplexer 914). A multiplexer 914 may be configured to use the indication of the identified multiplexer input to select a multiplexer input port (e.g., an MM data input port 916, a max pool port 918, or a load port 920) from which to provide data to the multiplexer output port 924. For example, the multiplexer 914 may include a switch (or multiple switches) to direct a flow of current through the multiplexer 914, and may adjust one or more switches to direct the identified multiplexer input to the multiplexer output port 924, such as by connecting a corresponding multiplexer input port to the multiplexer output port (e.g., while disconnecting other multiplexer input ports from the multiplexer output port). In some implementations, the token generator 930 may be configured to indicate the same multiplexer input (or the same multiplexer input port), such as by indicating the same multiplexer input port identifier, to each multiplexer 914 at a particular instance of the token cycle.

Alternatively, the token generator 930 may be configured to provide the token value to each multiplexer 914 via a corresponding token port 922 (e.g., instead of providing an indication of a multiplexer input to each multiplexer 914). In these implementations, each multiplexer 914 may include a coordination mode port (sometimes called a multiplexer coordination mode port) configured to receive the indication of the coordination mode (e.g., via the coordination mode port 908 and one or more corresponding buses, such as the coordination mode bus). The multiplexer 914 may be configured to identify a data structure to be used to identify the multiplexer input to be provided as the multiplexer output based on the coordination mode, in a similar manner as described above in connection with the token generator 930. The multiplexer 914 may be configured to identify the multiplexer input from the identified data structure based on the token value received from the token generator 930, in a similar manner as described above. In these implementations, the token generator 930 may not include a coordination mode port and may not receive an indication of the coordination mode. The multiplexer 914 may be configured to use the identified multiplexer input to select a multiplexer input port (e.g., an MM data input port 916, a max pool port 918, or a load port 920) from which to provide data to the multiplexer output port 924, in a similar manner as described above.

A multiplexer 914 may output the identified (or selected) multiplexer input from the multiplexer 914 via the multiplexer output port 924. In some implementations, the multiplexer output port 924 is connected with an MM component 302. For example, a multiplexer output port 924 may be connected to the map memory components 308 of a particular MM component 302. Thus, the multiplexer output that is output from the multiplexer output port 924 may be loaded into one or more of the map memory components 308 of a particular MM component 302. In some implementations, each multiplexer 914 is connected to a different MM component 302 (e.g., via a corresponding multiplexer output port 924). For example, as shown in FIG. 9, the output from the first multiplexer 914a is provided to the first MM component 302a or MM[0], the output from the second multiplexer 914b is provided to the second MM component 302b or MM[1], the output from the third multiplexer 914c is provided to the third MM component 302c or MM[2], and the output from the fourth multiplexer 914d is provided to the fourth MM component 302d or MM[3].

In some implementations, the DD component 304 may be configured to output processed map data (e.g., processed by one or more MM components 302 and/or the DD component 304) to the memory 322 of the system 320. For example, the multiplexers 914 may receive a control signal. Based on the value of the control signal, a multiplexer 914 may output multiplexer output (sometimes called processed map data) to either an MM component 302 or the system 320. For example, if the control signal has a first value (e.g., 0), then the multiplexer 914 may output the multiplexer output to an MM component 302. If the control signal has a second value (e.g., 1), then the multiplexer 914 may output the multiplexer output to the system 320 for storage by the memory 322 (e.g., rather than or in addition to outputting the multiplexer output to an MM component 302). Alternatively, the DD component 304 may include one or more other components (e.g., a demultiplexer) configured to receive the multiplexer output and provide the multiplexer output (e.g., as processed map data) to either an MM component 302 or the system 320 (e.g., via a DD output port) based on the control signal. Thus, the DD component 304 may be configured to load processed map data into the map memory components 308 of one or more MM components 302 and/or may be configured to load processed map data into the memory 322.

The configuration of the components described in connection with FIG. 9 enables the DD component 304 to operate on data in one of multiple coordination modes (e.g., a cooperative mode or an independent mode) using the same device architecture.

As indicated above, FIG. 9 is provided as an example. Other examples may differ from what is described with regard to FIG. 9.

Figure 10:
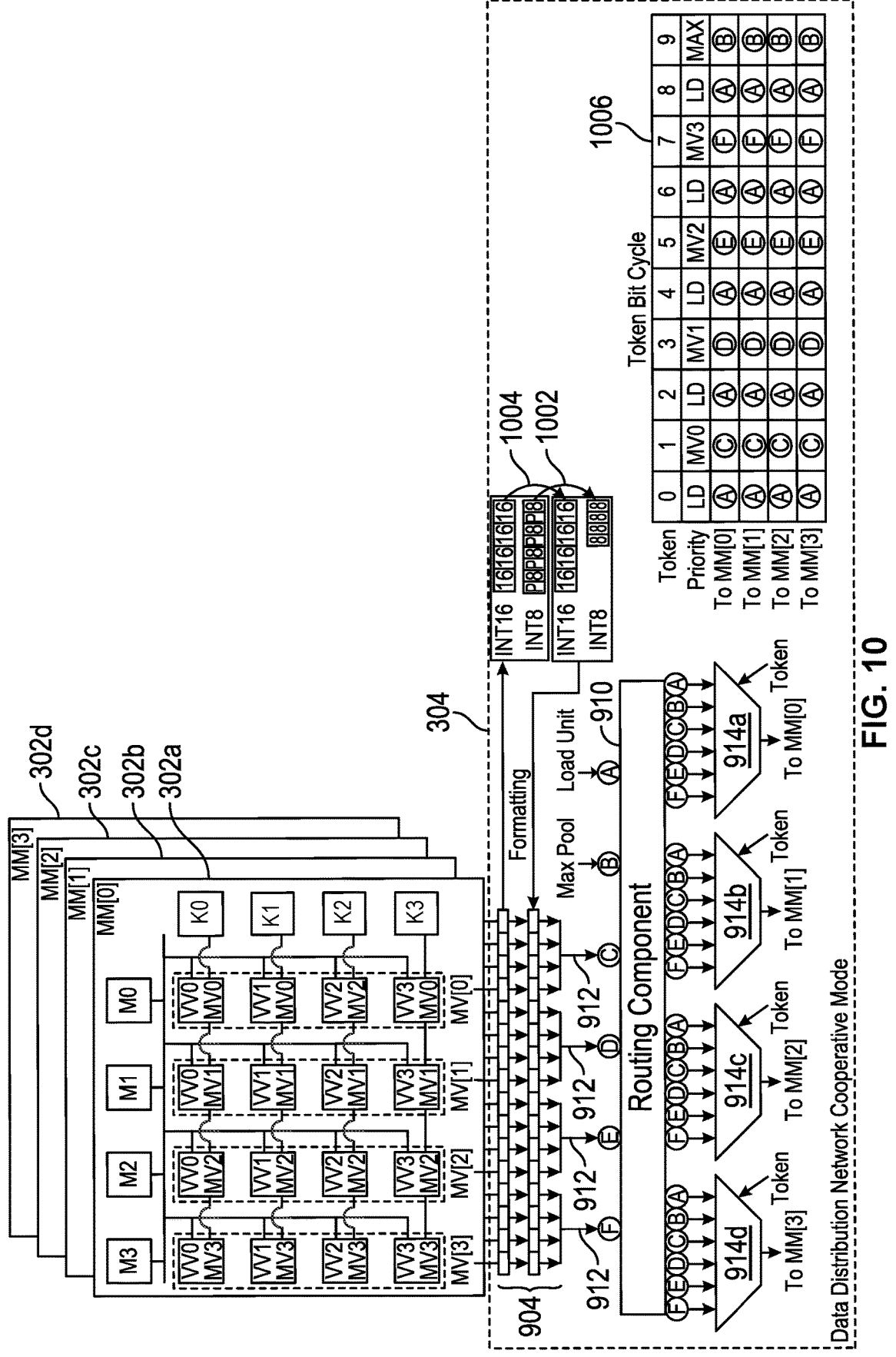
FIG. 10 and FIG. 11 are diagrams illustrating example coordination modes of a data distribution component for deep learning acceleration with mixed precision.

FIG. 10 is a diagram illustrating an example coordination mode of a DD component 304 for deep learning acceleration with mixed precision. FIG. 10 shows example operations performed by the DD component 304 in a first coordination mode, shown as a cooperative mode. The coordination mode may indicate whether outputs from different MM components 302 are to be combined (e.g., in the DD component 304). For example, in the cooperative mode, MM data from multiple MM components 302 is combined by the DD component 304 to generate map data (sometimes called output map data or DD output) to be loaded into one or more map memory components 308 and/or to be stored in memory 322 (e.g., external from the device 300).

In the example of FIG. 10, the DD component 304 is configured to received four 64-bit inputs (for a total of 256 bits) from each MM component 302 in a clock cycle. For example, each 64-bit input received from an MM component 302 may be a different AF output (e.g., generated by a respective AF component 402) of that MM component 302. Furthermore, each 64-bit input includes four 16-bit values. For example, each 16-bit value may be a different rounded AF value generated by a respective rounding component 452. In the INT16 mode, a 16-bit value represents a single 16-bit word. In the INT8 mode, a 16-bit value represents two 8-bit words. The two 8-bit words may include a first word consisting of padding (e.g., 8 padding bits) and a second word consisting of 8 bits that represent data to be operated on or stored (e.g., map data).

As shown in FIG. 10, and by reference number 1002, in the cooperative mode and the INT8 mode (e.g., a second output precision mode), the formatting component 904 may be configured to remove the padding (e.g., the first 8-bit word or the 8 padding bits) from each 16-bit value to generate the formatted DD data. This formatting results in the second 8-bit word (e.g., the 8 bits of map data) of each 16-bit value being preserved. As shown by reference number 1004, in the cooperative mode and the INT16 mode (e.g., a first output precision mode), the formatting component 904 may be configured to refrain from removing any bits from the 16-bit value (e.g., because there are no padding bits in the 16-bit value in the INT16 mode).

In the cooperative mode and in either output precision mode (e.g., regardless of the output precision mode), the DD component 304 (e.g., using the formatting component 904) may be configured to concatenate one value from each MM component to generate a formatted DD data segment. For example, the DD component 304 may be configured to generate a first formatted DD data segment (sometimes called first concatenated MM data or a first concatenated MM value) by concatenating a first AF output from the first MM component 302a (e.g., MM[0].MV[0]), a first AF output from the second MM component 302b (e.g., MM[1] .MV[0]), a first AF output from the third MM component 302c (e.g., MM[2].MV[0]), and a first AF output from the fourth MINI component 302d (e.g., MM[3].MV[0]). Similarly, the DD component 304 may be configured to generate a second formatted DD data segment (sometimes called second concatenated MM data or a second concatenated MM value) by concatenating a second AF output from the first MM component 302a (e.g., MM[0].MV[1]), a second AF output from the second MM component 302b (e.g., MM[1].MV[1]), a second AF output from the third MM component 302c (e.g., MM[2].MV[1]), and a second AF output from the fourth MM component 302d (e.g., MM[3] .MV[1]). Similarly, the DD component 304 may be configured to generate a third formatted DD data segment (sometimes called third concatenated MM data or a third concatenated MM value) by concatenating a third AF output from the first MM component 302a (e.g., MM[0].MV[2]), a third AF output from the second MM component 302b (e.g., MM[1].MV[2]), a third AF output from the third MM component 302c (e.g., MM[2].MV[2]), and a third AF output from the fourth MM component 302d (e.g., MM[3] .MV[2]). Similarly, the DD component 304 may be configured to generate a fourth formatted DD data segment (sometimes called fourth concatenated MM data or a fourth concatenated MM value) by concatenating a fourth AF output from the first MM component 302a (e.g., MM[0] .MV[3]), a fourth AF output from the second MM component 302b (e.g., MM[1].MV[3]), a fourth AF output from the third MM component 302c (e.g., MM[2].MV[3]), and a fourth AF output from the fourth MM component 302d (e.g., MM[3].MV[3]). In the example of FIG. 10, because each AF output is 64 bits, each concatenated MM value is 256 bits.

In the INT16 mode, the first concatenated MM value, the second concatenated MM value, the third concatenated MM value, and the fourth concatenated MM value may each be 256 bits. In the INT8 mode, the first concatenated MM value, the second concatenated MM value, the third concatenated MM value, and the fourth concatenated MM value may each be 128 bits. As shown in FIG. 10, the DD component 304 (e.g., the formatting component 904) may be configured to provide the first concatenated MM value, the second concatenated MM value, the third concatenated MM value, and the fourth concatenated MM value to the routing component 910 via corresponding buses 912.

In the cooperative mode, the routing component 910 may be configured to provide the first concatenated MM value (shown as C) to each multiplexer 914 via respective first MM data input ports 916, may be configured to provide the second concatenated MM value (shown as D) to each multiplexer 914 via respective second MM data input ports 916, may be configured to provide the third concatenated MM value (shown as F) to each multiplexer 914 via respective third MM data input ports 916, and may be configured to provide the fourth concatenated MM value (shown as F)

to each multiplexer 914 via respective fourth MM data input ports 916. Thus, in the cooperative mode, the routing component 910 may be configured to route the same group of MM values to each multiplexer 914. Furthermore, each multiplexer 914 includes a first MM data input port, a second MM data input port, a third MM data input port, and a fourth MM data input port. As further shown, each multiplexer 914 may include a load port 920 configured to receive external map data (shown as A) and a max pool port 918 configured to receive max pool data (shown as B). Although FIG. 10 and FIG. 11 (described below) show each multiplexer 914 as including four MM data input ports 916, in some implementations, there may be a different number of MM data input ports 916 per multiplexer 914. For example, the number of MM data input ports 916 per multiplexer 914 may be equal to the number of MM components 302 included in the device 300.

As shown in FIG. 10, in the cooperative mode, the token generator 930 and/or each multiplexer 914 may be configured to use a first data structure 1006 (sometimes called a cooperative mode data structure) to identify a multiplexer input to be provided as a multiplexer output (e.g., to an MM component 302 and/or to memory 322). In the example of FIG. 10, the multiplexer input includes the external map data (from the load port 920 and represented as A), the max pool data (from the max pool port 918 and represented as B), the first concatenated MM value (from a first MM data input port 916 and represented as C), the second concatenated MM value (from a second MM data input port 916 and represented as D), the third concatenated MM value (from a third MM data input port 916 and represented as E), and the fourth concatenated MM value (from a fourth MM data input port 916 and represented as F).

In the cooperative mode, each multiplexer 914 is configured to output the same multiplexer input to a different MM component 302 for a particular token value. For example, as shown in the first data structure 1006, if the token value is 0, then the multiplexers 914 are configured to output the external map data (A) to corresponding MM components 302 (e.g., based on selection of or prioritization of the load port 920, represented as LD in the first data structure 1006). If the token value is 1, then the multiplexers 914 are configured to output the first concatenated MM value (C) to corresponding MM components 302 (e.g., based on selection of or prioritization of the first MM data input port 916, represented as MV0 in the first data structure 1006). If the token value is 2, then the multiplexers 914 are configured to output the external map data (A) to corresponding MM components 302. If the token value is 3, then the multiplexers 914 are configured to output the second concatenated MM value (D) to corresponding MM components 302 (e.g., based on selection of or prioritization of the second MM data input port 916, represented as MV1 in the first data structure 1006). If the token value is 4, then the multiplexers 914 are configured to output the external map data (A) to corresponding MM components 302. If the token value is 5, then the multiplexers 914 are configured to output the third concatenated MM value (E) to corresponding MM components 302 (e.g., based on selection of or prioritization of the third MM data input port 916, represented as MV2 in the first data structure 1006). If the token value is 6, then the multiplexers 914 are configured to output the external map data (A) to corresponding MM components 302. If the token value is 7, then the multiplexers 914 are configured to output the fourth concatenated MM value (F) to corresponding MM components 302 (e.g., based on selection of or prioritization of the fourth MM data input port 916, represented as MV3 in the first data structure 1006). If the token value is 8, then the multiplexers 914 are configured to output the external map data (A) to corresponding MM components 302. If the token value is 9, then the multiplexers 914 are configured to output the max pool data (B) to corresponding MM components 302 (e.g., based on selection of or prioritization of the max pool port 918, represented as MAX in the first data structure 1006).

Figure 11:
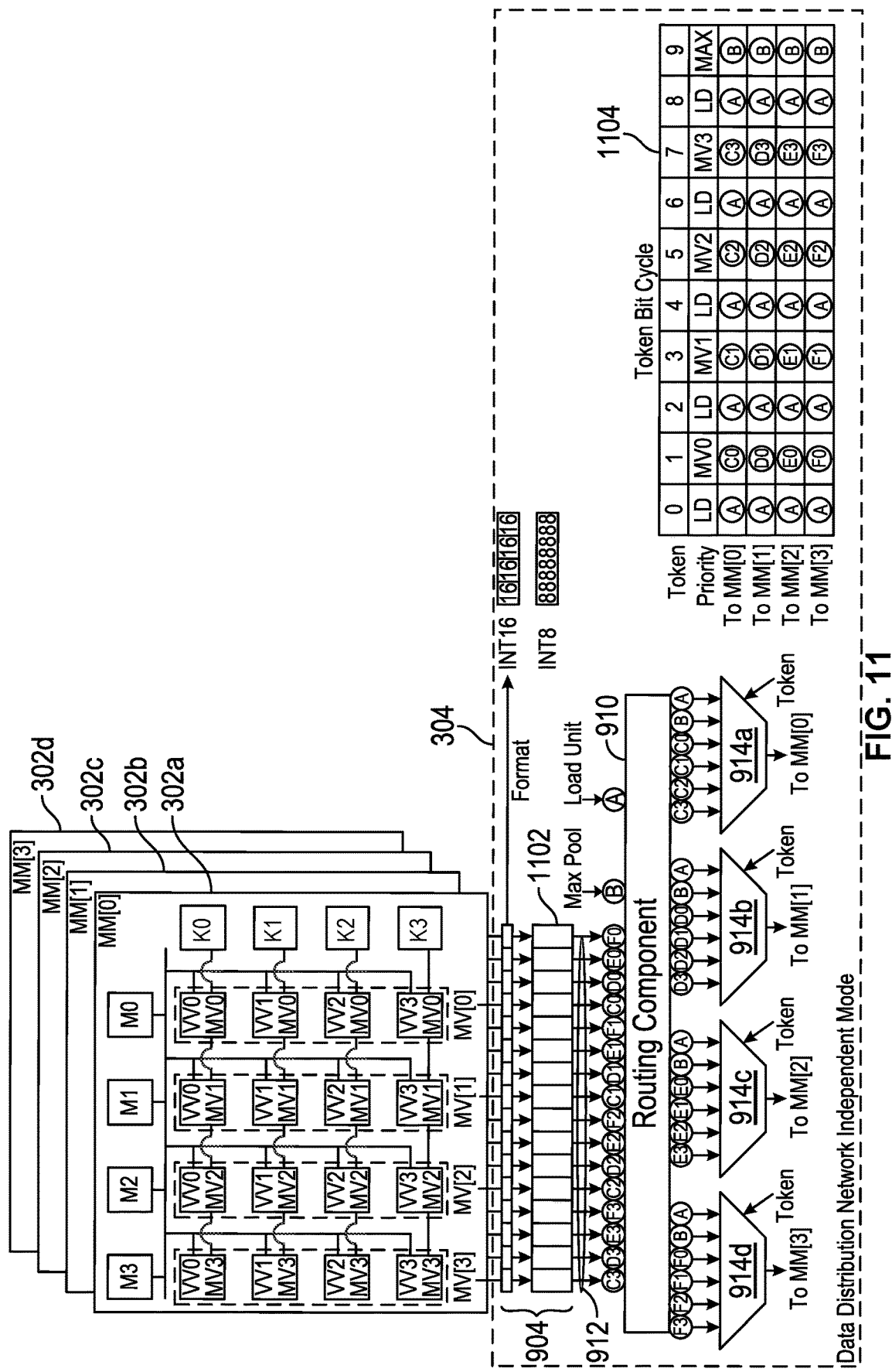

The mapping of multiplexer inputs to token values described above and shown in the first data structure 1006 is provided as an example, and a different mapping may be used in some implementations. In some implementations, the DD component 304 (e.g., using the multiplexer 914 and/or the token generator 930) may be configured to select the max pool data (via selection of the max pool port 918) once per token cycle, may be configured to select each one of the concatenated MM values (via selection of each one of the multiple MM data input ports 916) once per token cycle, and/or may be configured to select the external map data (e.g., via selection of the load port 920) in all other instances of the token cycle. Thus, in some implementations, the DD component 304 may be configured to select the load port 920 (and the corresponding external map data) in every instance that immediately follows selection of the max pool port (and the corresponding max pool data) or that immediately follows selection of an MM data input port (and the corresponding concatenated MM value). In some implementations, the token cycle causes selection of the load port 920 for every even token value, as shown in FIG. 10 and FIG. 11. Alternatively, the token cycle may cause selection of the load port 920 for every odd token value. In some implementations, the token cycle causes selection of the load port 920 in every other instance of the token cycle (e.g., with one instance in between consecutive instances in which the load port 920 is selected). The DD component 304 (e.g., using the multiplexer 914 and/or the token generator 930) may be configured to select a multiplexer input port and/or a corresponding multiplexer input to be output from the multiplexer 914 based on the token cycle and/or the mapping of multiplexer inputs to token values stored in a data structure, such as the first data structure 1006.

In the examples of FIG. 10 and FIG. 11, the token cycle (shown as a token bit cycle) has ten instances, and the token value is a different value for each of the ten instances. For example, the token generator 930 is configured to generate a token value of 0 in a first instance, a token value of 1 in a second instance, a token value of 2 in a third instance, a token value of 3 in a fourth instance, a token value of 4 in a fifth instance, a token value of 5 in a sixth instance, a token value of 6 in a seventh instance, a token value of 7 in an eighth instance, a token value of 8 in a ninth instance, and a token value of 9 in a tenth instance. After the tenth instance, the token cycle returns to the first instance and repeats the ten instances, and so on. Although the example token cycle has ten instances, the token cycle may have a different number of instances in some implementations. The number of instances in the token cycle may be based on the number of MM data input ports 916 per multiplexer 914. For example, the number of token cycle instances may be equal to two times the number of MM data input ports (per multiplexer 914) plus two, or (2×I)+2, where I is the number of MM data input ports 916 per multiplexer 914. Similarly, the number of multiplexer input ports of each multiplexer 914 may be equal to two times the number of MM data input ports 916 (per multiplexer 914) plus two, shown as six total multiplexer input ports per multiplexer 914 in the example of FIG. 10.

In some implementations, the DD component 304 may be configured to use a port identifier to indicate a multiplexer input port (e.g., to a multiplexer 914). For example, the load port 920 (A) may have a port identifier of 0, the max pool port 918 (B) may have a port identifier of 1, the first MM data input port 916 (C) may have a port identifier of 2, the second MM data input port 916 (D) may have a port identifier of 3, the third MM data input port 916 (E) may have a port identifier of 4, and the fourth MM data input port 916 (F) may have a port identifier of 4.

As indicated above, FIG. 10 is provided as an example. Other examples may differ from what is described with regard to FIG. 10.

FIG. 11 is a diagram illustrating an example coordination mode of a DD component 304 for deep learning acceleration with mixed precision. FIG. 11 shows example operations performed by the DD component 304 in a second coordination mode, shown as an independent mode. The coordination mode may indicate whether outputs from different MM components 302 are to be combined (e.g., in the DD component 304). For example, in the independent mode, MM data from an individual MM component 302 is kept independent and separate from MM data from other MM components 302 when generating map data (sometimes called output map data or DD output) to be loaded into one or more map memory components 308 and/or to be stored in memory 322. In other words, in the independent mode, data from multiple MM components 302 is not combined by the DD component 304.

In the example of FIG. 11, the DD component 304 is configured to received four 64-bit inputs (for a total of 256 bits) from each MM component 302 in a clock cycle. For example, each 64-bit input received from an MM component 302 may be a different AF output (e.g., generated by a respective AF component 402) of that MM component 302. Furthermore, each 64-bit input includes four 16-bit values. For example, each 16-bit value may be a different rounded AF value generated by a respective rounding component 452. In the INT16 mode, a 16-bit value represents a single 16-bit word. In the INT8 mode, a 16-bit value represents two 8-bit words. The two 8-bit words may include a first word consisting of padding (e.g., 8 padding bits) and a second word consisting of 8 bits that represent data to be operated on or stored (e.g., map data).

As shown in FIG. 11, and by reference number 1102, in the independent mode, the formatting component 904 may be configured to buffer (e.g., concatenate) the AF outputs for a number of clock cycles before providing buffered MM data to the routing component 910 (e.g., as a DD data segment). In contrast with the cooperative mode described above in connection with FIG. 10, in the independent mode, the DD component 304 (e.g., the formatting component 904) does not concatenate values from different MM components to generate a formatted DD data segment (or a concatenated MM value). Instead, in the independent mode, the DD component 304 (e.g., the formatting component 904) is configured to concatenate AF outputs that are output from a particular AF component 402 of a particular MM component 302 for a number of clock cycles to generate a concatenated MM value. Thus, in the independent mode, the formatting component 904 may be configured to generate a number of concatenated MM values, per MM component 302, that is equal to the number of AF components 402 included in an MM component 302 (e.g., four concatenated MM values per MM component 302 in the example of FIG. 11). In the example of FIG. 11, the formatting component 904 is configured to concatenate AF outputs for 16 clock cycles, although a different number of clock cycles may be used in some implementations.

For example, the formatting component 904 may be configured to generate a first concatenated MM value for the first MM component 302a (sometimes called a first global MM value) by concatenating AF outputs that are output from a first AF component 402 of the first MM components 302a for 16 clock cycles. The formatting component 904 may be configured to generate a second concatenated MM value for the first MM component 302a (sometimes called a second global MM value) by concatenating AF outputs that are output from a second AF component 402 of the first MM components 302a for 16 clock cycles. The formatting component 904 may be configured to generate a third concatenated MM value for the first MM component 302a (sometimes called a third global MM value) by concatenating AF outputs that are output from a third AF component 402 of the first MM components 302a for 16 clock cycles. The formatting component 904 may be configured to generate a fourth concatenated MM value for the first MM component 302a (sometimes called a fourth global MM value) by concatenating AF outputs that are output from a fourth AF component 402 of the first MM components 302a for 16 clock cycles.

Similarly, the formatting component 904 may be configured to generate a first concatenated MM value for the second MM component 302b (sometimes called a fifth global MM value) by concatenating AF outputs that are output from a first AF component 402 of the second MM component 302b for 16 clock cycles. The formatting component 904 may be configured to generate a second concatenated MM value for the second MM component 302b (sometimes called a sixth global MM value) by concatenating AF outputs that are output from a second AF component 402 of the second MM component 302b for 16 clock cycles. The formatting component 904 may be configured to generate a third concatenated MM value for the second MM component 302b (sometimes called a seventh global MM value) by concatenating AF outputs that are output from a third AF component 402 of the second MM component 302b for 16 clock cycles. The formatting component 904 may be configured to generate a fourth concatenated MM value for the second MM component 302b (sometimes called an eighth global MM value) by concatenating AF outputs that are output from a fourth AF component 402 of the second MM component 302b for 16 clock cycles.

Similarly, the formatting component 904 may be configured to generate a first concatenated MM value for the third MM component 302c (sometimes called a ninth global MM value) by concatenating AF outputs that are output from a first AF component 402 of the third MM component 302c for 16 clock cycles. The formatting component 904 may be configured to generate a second concatenated MM value for the third MM component 302c (sometimes called a tenth global MM value) by concatenating AF outputs that are output from a second AF component 402 of the third MM component 302c for 16 clock cycles. The formatting component 904 may be configured to generate a third concatenated MM value for the third MM component 302c (sometimes called an eleventh global MM value) by concatenating AF outputs that are output from a third AF component 402 of the third MM component 302c for 16 clock cycles. The formatting component 904 may be configured to generate a fourth concatenated MM value for the third MM component 302c (sometimes called a twelfth global MM value) by concatenating AF outputs that are output from a fourth AF component 402 of the third MM component 302*c* for 16 clock cycles.

Similarly, the formatting component 904 may be configured to generate a first concatenated MM value for the fourth MM component 302*d* (sometimes called a thirteenth global MM value) by concatenating AF outputs that are output from a first AF component 402 of the fourth MM component 302*d* for 16 clock cycles. The formatting component 904 may be configured to generate a second concatenated MM value for the fourth MM component 302*d* (sometimes called a fourteenth global MM value) by concatenating AF outputs that are output from a second AF component 402 of the fourth MM component 302*d* for 16 clock cycles. The formatting component 904 may be configured to generate a third concatenated MM value for the fourth MM component 302*d* (sometimes called a fifteenth global MM value) by concatenating AF outputs that are output from a third AF component 402 of the fourth MM component 302*d* for 16 clock cycles. The formatting component 904 may be configured to generate a fourth concatenated MM value for the fourth MM component 302*d* (sometimes called a sixteenth global MM value) by concatenating AF outputs that are output from a fourth AF component 402 of the fourth MM component 302*d* for 16 clock cycles.

In the example of FIG. 11, where each of the AF outputs is 64 bits, each of the global MM values (e.g., the first through sixteenth global MM values) is 256 bits. In FIG. 11, the first global MM value (and a corresponding first global MM data port) is shown as C0, the second global MM value (and a corresponding second global MM data port) is shown as C1, the third global MM value (and a corresponding third global MM data port) is shown as C2, the fourth global MM value (and a corresponding fourth global MM data port) is shown as C3, the fifth global MM value (and a corresponding fifth global MM data port) is shown as D0, the sixth global MM value (and a corresponding sixth global MM data port) is shown as D1, the seventh global MM value (and a corresponding seventh global MM data port) is shown as D2, the eighth global MM value (and a corresponding eighth global MM data port) is shown as D3, the ninth global MM value (and a corresponding ninth global MM data port) is shown as E0, the tenth global MM value (and a corresponding tenth global MM data port) is shown as E1, the eleventh global MM value (and a corresponding eleventh global MM data port) is shown as E2, the twelfth global MM value (and a corresponding twelfth global MM data port) is shown as E3, the thirteenth global MM value (and a corresponding thirteenth global MM data port) is shown as F0, the fourteenth global MM value (and a corresponding fourteenth global MM data port) is shown as F1, the fifteenth global MM value (and a corresponding fifteenth global MM data port) is shown as F2, and the sixteenth global MM value (and a corresponding sixteenth global MM data port) is shown as F3.

As shown in FIG. 11, the DD component 304 (e.g., the formatting component 904) may be configured to provide each of the global MM values to the routing component 910 via corresponding buses 912. In the independent mode, the routing component 910 may be configured to provide the first, second, third, and fourth global MM values (shown as C0, C1, C2, and C3, respectively) to the first multiplexer 914*a* via respective first, second, third, and fourth MM data input ports 916 of the first multiplexer 914*a*. Similarly, in the independent mode, the routing component 910 may be configured to provide the fifth, sixth, seventh, and eighth global MM values (shown as D0, D1, D2, and D3, respectively) to the second multiplexer 914*b* via respective first, second, third, and fourth MM data input ports 916 of the second multiplexer 914*b*. Similarly, in the independent mode, the routing component 910 may be configured to provide the ninth, tenth, eleventh, and twelfth global MM values (shown as E0, E1, E2, and E3, respectively) to the third multiplexer 914*c* via respective first, second, third, and fourth MM data input ports 916 of the third multiplexer 914*c*. Similarly, in the independent mode, the routing component 910 may be configured to provide the thirteenth, fourteenth, fifteenth, and sixteenth global MM values (shown as F0, F1, F2, and F3, respectively) to the fourth multiplexer 914*d* via respective first, second, third, and fourth MM data input ports 916 of the fourth multiplexer 914*d*.

Thus, in the independent mode, the routing component 910 may be configured to route a different group of MM values to each multiplexer 914. Furthermore, each multiplexer 914 includes a first MM data input port, a second MM data input port, a third MM data input port, and a fourth MM data input port. However, in contrast to the cooperative mode, in the independent mode, each multiplexer 914 receives different MM data on a particular MM data input port in a particular instance of a token cycle. As described above in connection with FIG. 10, each multiplexer 914 may include a load port 920 configured to receive external map data (shown as A) and a max pool port 918 configured to receive max pool data (shown as B).

As shown in FIG. 11, in the independent mode, the token generator 930 and/or each multiplexer 914 may be configured to use a second data structure 1104 (sometimes called an independent mode data structure) to identify a multiplexer input to be provided as a multiplexer output (e.g., to an MM component 302 and/or to memory 322). In the example of FIG. 11, the multiplexer input includes the external map data (from the load port 920 and represented as A), the max pool data (from the max pool port 918 and represented as B), and the sixteen global MM values (represented as C0, C1, C2, C3, D0, D1, D2, D3, E0, E1, E2, E3, F0, F1, F2, and F3).

In the independent mode, each multiplexer 914 may be configured to output the same multiplexer input or a different multiplexer input to a different MM component 302 for a particular token value, depending on the token value. For example, as shown in the second data structure 1104, if the token value is 0, then the multiplexers 914 are configured to output the external map data (A) to corresponding MM components 302. If the token value is 1, then a multiplexer 914 is configured to output an MM value received via the first MM data input port 916 of that multiplexer. Thus, for the token value of 1, the first multiplexer 914*a* is configured to output the first global MM value (C0), the second multiplexer 914*b* is configured to output the fifth global MM value (D0), the third multiplexer 914*c* is configured to output the ninth global MM value (E0), and the fourth multiplexer 914*d* is configured to output the thirteenth global MM value (F0). If the token value is 2, then the multiplexers 914 are configured to output the external map data (A) to corresponding MM components 302. If the token value is 3, then a multiplexer 914 is configured to output an MM value received via the second MM data input port 916 of that multiplexer. Thus, for the token value of 3, the first multiplexer 914*a* is configured to output the second global MM value (C1), the second multiplexer 914*b* is configured to output the sixth global MM value (D1), the third multiplexer 914*c* is configured to output the tenth global MM value (E1), and the fourth multiplexer 914*d* is configured to output the fourteenth global MM value (F1). If the token value is 4, then the multiplexers 914 are configured to output the external map data (A) to corresponding MM components 302. If the token value is 5, then a multiplexer 914 is configured to output an MM value received via the third MM data input port 916 of that multiplexer. Thus, for the token value of 5, the first multiplexer 914a is configured to output the third global MM value (C2), the second multiplexer 914b is configured to output the seventh global MM value (D2), the third multiplexer 914c is configured to output the eleventh global MM value (E2), and the fourth multiplexer 914d is configured to output the fifteenth global MM value (F2). If the token value is 6, then the multiplexers 914 are configured to output the external map data (A) to corresponding MM components 302. If the token value is 7, then a multiplexer 914 is configured to output an MM value received via the fourth MM data input port 916 of that multiplexer. Thus, for the token value of 7, the first multiplexer 914a is configured to output the fourth global MM value (C3), the second multiplexer 914b is configured to output the eighth global MM value (D3), the third multiplexer 914c is configured to output the twelfth global MM value (E3), and the fourth multiplexer 914d is configured to output the sixteenth global MM value (F3). If the token value is 8, then the multiplexers 914 are configured to output the external map data (A) to corresponding MM components 302. If the token value is 9, then the multiplexers 914 are configured to output the max pool data (B) to corresponding MM components 302.

The mapping of multiplexer inputs to token values described above and shown in the second data structure 1104 are provided as an example, and a different mapping may be used in some implementations. In some implementations, the DD component 304 (e.g., using the multiplexer 914 and/or the token generator 930) may be configured to select the max pool data (via selection of the max pool port 918) once per token cycle, may be configured to select each one of the concatenated MM values (sometimes called global MM values in the independent mode, and which may be selected via selection of each one of the multiple MM data input ports 916) once per token cycle, and/or may be configured to select the external map data (e.g., via selection of the load port 920) in all other instances of the token cycle. Thus, in some implementations, the DD component 304 may be configured to select the load port 920 (and the corresponding external map data) in every instance that immediately follows selection of the max pool port (and the corresponding max pool data) or that immediately follows selection of an MM data input port (and the corresponding concatenated MM data). The DD component 304 (e.g., using the multiplexer 914 and/or the token generator 930) may be configured to select a multiplexer input port and/or a corresponding multiplexer input to be output from the multiplexer 914 based on the token cycle and/or the mapping of multiplexer inputs to token values stored in a data structure, such as the second data structure 1104.

The configuration of the components described in connection with FIGS. 9-11 enables the DD component 304 to operate on data received from the MM component 302 using the same device architecture regardless of the precision mode and regardless of the coordination mode.

As indicated above, FIG. 11 is provided as an example. Other examples may differ from what is described with regard to FIG. 11.

FIG. 12 is a flowchart of an example method 1200 associated with deep learning acceleration with mixed precision. In some implementations, one or more process blocks of FIG. 12 may be performed by a device, such as a MAC component 416. In some implementations, one or more process blocks of FIG. 12 may be performed by a device other than a MAC component 416 and/or by a group of devices included in a MAC component 416, such as one or more components of a MAC component 416 (e.g., a multiplier component 508 and/or an adder component 510) and/or one or more sub-components of those components (e.g., one or more components or devices described above in connection with FIGS. 3-11).

As shown in FIG. 12, the method 1200 may include receiving a map data segment (block 1210). As further shown in FIG. 12, the method 1200 may include receiving a kernel data segment (block 1220). As further shown in FIG. 12, the method 1200 may include receiving an indication of an input precision mode that indicates a word length for the map data segment and for the kernel data segment (block 1230). As further shown in FIG. 12, the method 1200 may include generating a multiplier component output based on the input precision mode, based on multiplying a first half of the map data segment and a first half of the kernel data segment to generate a first multiplier output, and based on multiplying a second half of the map data segment and a second half of the kernel data segment to generate a second multiplier output (block 1240). As further shown in FIG. 12, the method 1200 may include generating an adder component output based on the input precision mode, based on adding a first half of the multiplier component output and a first half of a return value to generate a first adder output, and based on adding a second half of the multiplier component output and a second half of the return value to generate a second adder output (block 1250). As further shown in FIG. 12, the method 1200 may include outputting the adder component output (block 1260).

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform one or more other methods based on operations described herein, such as the operations described in connection with FIGS. 3-11.

In some implementations, a device includes a first data port configured to receive a map data segment. In some implementations, the device includes a second data port configured to receive a kernel data segment. In some implementations, the device includes a precision mode port configured to receive an indication of an input precision mode that indicates a word length for the map data segment and for the kernel data segment. In some implementations, the device includes a multiplier component that is configured to generate a multiplier component output based on the input precision mode and based on multiplying the map data segment and the kernel data segment. In some implementations, the device includes an adder component configured to generate an adder component output based on the input precision mode and based on the multiplier component output. In some implementations, the device includes an output port configured to output the adder component output.

In some implementations, a method includes receiving a map data segment via a first port. In some implementations, the method includes receiving a kernel data segment via a second port. In some implementations, the method includes receiving, via a third port, an indication of an input precision mode that indicates a word length for the map data segment and for the kernel data segment. In some implementations, the method includes generating a multiplier component output based on the input precision mode, based on multiplying a first half of the map data segment and a first half of the kernel data segment to generate a first multiplier output, and based on multiplying a second half of the map data segment and a second half of the kernel data segment to generate a second multiplier output. In some implementations, the method includes generating an adder component output based on the input precision mode, based on adding a first half of the multiplier component output and a first half of a return value, received via a return port, to generate a first adder output, and based on adding a second half of the multiplier component output and a second half of the return value to generate a second adder output. In some implementations, the method includes outputting the adder component output via a fourth port.

In some implementations, an apparatus includes means for receiving a map data segment. In some implementations, the apparatus includes means for receiving a kernel data segment. In some implementations, the apparatus includes means for receiving an indication of an input precision mode that indicates a word length for the map data segment and for the kernel data segment. In some implementations, the apparatus includes means for multiplying a first half of the map data segment and a first half of the kernel data segment to generate a first multiplier output. In some implementations, the apparatus includes means for multiplying a second half of the map data segment and a second half of the kernel data segment to generate a second multiplier output. In some implementations, the apparatus includes means for generating a multiplier component output based on the input precision mode, the first multiplier output, and the second multiplier output. In some implementations, the apparatus includes means for adding a first half of the multiplier component output and a first half of a return value to generate a first adder output. In some implementations, the apparatus includes means for adding a second half of the multiplier component output and a second half of the return value to generate a second adder output. In some implementations, the apparatus includes means for generating an adder component output based on the input precision mode, the first adder output, and the second adder output. In some implementations, the apparatus includes means for outputting the adder component output.

The foregoing disclosure provides illustration and description but is not intended to be exhaustive or to limit the aspects to the precise forms disclosed. Modifications and variations may be made in light of the above disclosure or may be acquired from practice of the aspects.

Implementations are described herein using particular names for ports, components, and devices to differentiate those ports, component, and devices from one another. In some cases, a port, a component, or a device may be referred to using an ordinal number rather than a particular name (e.g., in the claims below), such as a first port, a second port, a third port, a fourth port, a fifth port (and so on), a first component, a second component, a third component, a fourth component, a fifth component (and so on), a first device, a second device, a third device, a fourth device, a fifth device (and so on). In some cases, a port, a component, or a device may be referred to (e.g., in the claims below) without using a particular name or ordinal number. In some cases, the word "calculate" may be used (e.g., in the claims below) in place of the word "generate" (e.g., as used in this detailed description). As used herein, the phrase "number of" can be replace with the phrase "quantity of" and vice versa.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of"). As used herein, the terms "substantially" and "approximately" mean "within reasonable tolerances of manufacturing and measurement."

What is claimed is:

1. A device, comprising:
a first data port configured to receive a map data segment;
a second data port configured to receive a kernel data segment;
a precision mode port configured to receive an indication of an input precision mode that indicates a word length for the map data segment and for the kernel data segment;
a multiplier component configured to generate a multiplier component output based on the input precision mode and based on multiplying the map data segment and the kernel data segment;
an adder component configured to generate an adder component output, wherein to generate the adder component output, the adder component is configured to:
  obtain the multiplier component output from the multiplier component;
  add an upper half of the multiplier component output and an upper half of a return value, received via a return port of the adder component, to generate a first adder output; and
  add a lower half of the multiplier component output and a lower half of the return value to generate a second adder output;

a multiplexer configured to select the adder component output based on the input precision mode; and an output port configured to output the adder component output.

2. The device of claim 1, further comprising:

a first multiplier configured to multiply an upper half of the map data segment and an upper half of the kernel data segment to generate a first multiplier output;

a second multiplier configured to multiply a lower half of the map data segment and a lower half of the kernel data segment to generate a second multiplier output;

one or more components configured to concatenate the first multiplier output and the second multiplier output to generate a concatenated multiplier output; and a first adder configured to generate the multiplier component output by adding the concatenated multiplier output and, based on the input precision mode, one of a first value or a second value.

3. The device of claim 2, further comprising:

a third multiplier configured to multiply the lower half of the map data segment and the upper half of the kernel data segment to generate a third multiplier output;

a fourth multiplier configured to multiply the upper half of the map data segment and the lower half of the kernel data segment to generate a fourth multiplier output;

a second adder configured to generate a second adder output by adding the third multiplier output and the fourth multiplier output; and a left shift component configured to generate the first value by concatenating the second adder output with a set of least significant zero bits.

4. The device of claim 2, further comprising a zeros component configured to generate the second value as a set of zeros.

5. The device of claim 1, further comprising:

a first adder configured to add the upper half of the multiplier component output and the upper half of the return value to generate the first adder output;

a second adder configured to add the lower half of the multiplier component output and the lower half of the return value to generate the second adder output;

a third adder configured to add the first adder output and a carry bit, output by the second adder, to generate a third adder output;

one or more components configured to concatenate the first adder output and the second adder output to generate a first concatenated sum;

one or more components configured to concatenate the third adder output and the second adder output to generate a second concatenated sum; and the multiplexer configured to select, as the adder component output and based on the input precision mode, one of the first concatenated sum or the second concatenated sum.

6. The device of claim 5, further comprising a demultiplexer configured to:

receive the adder component output;

receive a default value;

receive a control signal; and output, based on the control signal, one of the adder component output or the default value to a return port of the adder component.

7. The device of claim 5, further comprising a demultiplexer configured to:

receive the adder component output;

receive a control signal; and output, based on the control signal, the adder component output to one of the adder component or the output port.

8. The device of claim 1, further comprising a second multiplexer configured to select, based on the input precision mode, a value to be used to generate the multiplier component output.

9. A method, comprising:

receiving, at a multiply-accumulate (MAC) component, a map data segment via a first port;

receiving, at the MAC component, a kernel data segment via a second port;

receiving, at the MAC component and via a third port, an indication of an input precision mode that indicates a word length for the map data segment and for the kernel data segment;

generating, by a mixed precision multiplier of the MAC component, a multiplier component output based on the input precision mode and based on:

multiplying a first half of the map data segment and a first half of the kernel data segment to generate a first multiplier output, and multiplying a second half of the map data segment and a second half of the kernel data segment to generate a second multiplier output;

generating, by a mixed precision adder of the MAC component, an adder component output based on the input precision mode and based on:

obtaining the multiplier component output from the mixed precision multiplier;

adding a first half of the multiplier component output and a first half of a return value, received via a return port of the mixed precision adder, to generate a first adder output, and adding a second half of the multiplier component output and a second half of the return value to generate a second adder output;

selecting, by a multiplexer, the adder component output based on the input precision mode; and outputting the adder component output via a fourth port.

10. The method of claim 9, wherein generating the multiplier component output comprises:

concatenating the first multiplier output and the second multiplier output to generate a concatenated multiplier output; and generating the multiplier component output by adding the concatenated multiplier output and, based on the input precision mode, one of a first value or a second value.

11. The method of claim 10, further comprising:

multiplying the second half of the map data segment and the first half of the kernel data segment to generate a third multiplier output;

multiplying the first half of the map data segment and the second half of the kernel data segment to generate a fourth multiplier output;

adding the third multiplier output and the fourth multiplier output to generate a second adder output;

generating the first value by concatenating the second adder output with a set of least significant zero bits; and generating the second value as a set of zeros.

12. The method of claim 9, wherein generating the adder component output comprises:

adding the first adder output and a carry bit to generate a third adder output, wherein the carry bit is generated based on adding the second half of the multiplier component output and the second half of the return value;

concatenating the first adder output and the second adder output to generate a first concatenated sum;

concatenating the third adder output and the second adder output to generate a second concatenated sum; and selecting, as the adder component output and based on the input precision mode, one of the first concatenated sum or the second concatenated sum.

13. The method of claim 9, wherein the map data segment is 16 bits, the kernel data segment is 16 bits, the multiplier component output is 48 bits, and the adder component output is 48 bits.

14. The method of claim 9, wherein the word length is one of 8 bits or 16 bits.

15. An apparatus, comprising:

means for receiving a map data segment;

means for receiving a kernel data segment;

means for receiving an indication of an input precision mode that indicates a word length for the map data segment and for the kernel data segment;

means for multiplying a first half of the map data segment and a first half of the kernel data segment to generate a first multiplier output;

means for multiplying a second half of the map data segment and a second half of the kernel data segment to generate a second multiplier output;

means for generating a multiplier component output based on the input precision mode, the first multiplier output, and the second multiplier output;

means for obtaining the multiplier component output;

means for adding a first half of the multiplier component output and a first half of a return value, received via a return port, to generate a first adder output;

means for adding a second half of the multiplier component output and a second half of the return value to generate a second adder output;

means for generating an adder component output based on the input precision mode, the first adder output, and the second adder output;

means for selecting the adder component output based on the input precision mode; and means for outputting the adder component output.

16. The apparatus of claim 15, further comprising means for selecting, based on the input precision mode, a value to be used to generate the multiplier component output, wherein the value is based on one of the first multiplier output or the second multiplier output.

17. The apparatus of claim 15, further comprising means for selecting, based on the input precision mode, a first value or a second value to be output as the adder component output, wherein each of the first value and the second value is based on the first adder output and the second adder output.

18. The apparatus of claim 15, further comprising:

means for receiving the adder component output;

means for receiving a default value;

means for receiving a control signal; and means for outputting, based on the control signal, one of the adder component output or the default value as the return value.

19. The apparatus of claim 15, further comprising:

means for receiving the adder component output;

means for receiving a control signal; and means for outputting, based on the control signal, the adder component output to one of an output port or a return port.

20. The apparatus of claim 15, wherein the means for generating the multiplier component output comprises:

means for concatenating the first multiplier output and the second multiplier output to generate a concatenated multiplier output; and means for generating the multiplier component output by adding the concatenated multiplier output and, based on the input precision mode, one of a first value or a second value.

* * * * *